United States Patent
Oda

(10) Patent No.: US 11,201,568 B2
(45) Date of Patent: Dec. 14, 2021

(54) VIBRATION ACTUATOR INCLUDING VIBRATION ELEMENT, AND APPARATUS

(71) Applicant: CANON KABUSHIKI KAISHA, Tokyo (JP)

(72) Inventor: Yuki Oda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 266 days.

(21) Appl. No.: 16/585,124

(22) Filed: Sep. 27, 2019

(65) Prior Publication Data

US 2020/0112271 A1 Apr. 9, 2020

(30) Foreign Application Priority Data

Oct. 3, 2018 (JP) .............................. JP2018-188430

(51) Int. Cl.
  *H02N 2/10* (2006.01)
  *H02N 2/00* (2006.01)
  *G03B 13/34* (2021.01)
  *G02B 7/04* (2021.01)

(52) U.S. Cl.
  CPC .............. *H02N 2/103* (2013.01); *G02B 7/04* (2013.01); *G03B 13/34* (2013.01); *H02N 2/006* (2013.01); *H02N 2/0065* (2013.01)

(58) Field of Classification Search
  CPC ...... H02N 2/103; H02N 2/006; H02N 2/0065; H02N 2/026; G03B 13/34; G03B 3/10; G03B 2205/0061; G02B 27/646; G02B 7/04; G02B 7/08; G02B 7/102
  See application file for complete search history.

(56) References Cited

U.S. PATENT DOCUMENTS

| 5,982,075 A * | 11/1999 | Hayasaka | ............. H02N 2/004 310/12.01 |
| 7,129,620 B2 | 10/2006 | Sakano | |
| 2005/0253485 A1* | 11/2005 | Kishi | .................... H02N 2/103 310/323.16 |

FOREIGN PATENT DOCUMENTS

JP        2005312264 A     11/2005

* cited by examiner

*Primary Examiner* — Emily P Pham
(74) *Attorney, Agent, or Firm* — Rossi, Kimms & McDowell LLP

(57) ABSTRACT

A vibration actuator capable of adjusting the position of a vibration element with respect to a contact body. The vibration actuator includes a vibration element unit and a contact body capable of relative movement to each other. The vibration element unit includes a first vibration element in contact with the contact body, an urging unit that brings the first vibration element and the contact body into contact with each other with predetermined pressure force, a first holding member that holds the first vibration element, a base, a first supporting member that slidably supports the first holding member in a direction in which the first vibration element is pressed against the contact body, and a first connection member that is rotatably connected to the first supporting member and rotatably connected to the base about an axis parallel to a direction of the relative movement.

23 Claims, 16 Drawing Sheets

A MODE

B MODE

VIBRATION ACTUATOR INCLUDING VIBRATION ELEMENT, AND APPARATUS

BACKGROUND OF THE INVENTION

Field of the Invention

The present invention relates to a vibration actuator that includes a vibration element and is used for a linear drive device and a rotary drive device, and an apparatus equipped with the vibration actuator.

Description of the Related Art

There is known a vibration actuator that causes a vibration element to generate predetermined vibration to apply a frictional driving force (thrust) to a contact body in contact with the vibration element, and thereby moves the vibration element and the contact body relative to each other. In such a vibration actuator, in a case where the vibration element is fixed, the contact body is moved with respect to the vibration element by the frictional driving force, whereas in a case where the contact body is fixed, the vibration element is moved with respect to the contact body by a reaction force of the frictional driving force.

For the vibration actuator, as a method of obtaining desired output, there has been proposed a method of bringing a plurality of vibration elements into contact with a common contact body and applying the frictional driving force to the contact body by combining the frictional driving forces of the vibration elements. For example, a vibration actuator described in Japanese Laid-Open Patent Publication (Kokai) No. 2005-312264 includes a housing, a shaft horizontally arranged such that the shaft extends through sides of the housing, and two vibration elements vertically sandwiching the shaft. Further, in this vibration actuator, the two vibration elements sandwiching the shaft are further vertically sandwiched by two urging engagement members, and tension spiral springs are attached to respective longitudinal one ends of the two urging engagement members, whereby the two urging engagement members are vertically pulled to each other. Thus, the two vibration elements are brought into pressure contact with the shaft by the urging forces received from the two urging engagement members, and when vibration is excited in the vibration elements, the shaft is moved in an axial direction (longitudinal direction).

However, in the vibration actuator described in Japanese Laid-Open Patent Publication (Kokai) No. 2005-312264, the longitudinal direction of the urging engagement members and the axial direction of the shaft are parallel to each other, and the tension spiral springs are attached to the respective one ends of the two urging engagement members in the longitudinal direction. Therefore, even in the vibration actuator which is small in the amount of movement of the shaft, the size thereof in the axial direction which is the moving direction of the shaft becomes large.

As an example of solution to this problem, there has been proposed a vibration actuator 80 having a structure, shown in a cross-sectional view in FIG. 16. Note that an X-axis, a Y-axis, and a Z-axis, which are orthogonal to each other, are defined as shown in FIG. 16 for convenience of explanation. The vibration actuator 80 includes a first supporting body 86, a second supporting body 81, a contact body 82, a vibration element 83, a coil spring 84, a support shaft 85, a rotation shaft 87, a roller 88, a cushioning member 89, and a pressure transfer member 90. The first supporting body 86 is movably fitted on the support shaft 85 extending in the X-axis direction. The contact body 82 is a member receiving a frictional drive force from the vibration element 83, and extends in the X-axis direction. Respective opposite ends of the support shaft 85 and the contact body 82 in the X-axis direction are fixed to fixing means, not shown. The vibration element 83 is supported on the first supporting body 86 via the pressure transfer member 90 and the cushioning member 89 such that the vibration element 83 is brought into contact with the contact body 82.

The second supporting body 81 is mounted to the first supporting body 86 in a state rotatable about the rotation shaft 87 disposed in parallel to the X-axis. The roller 88 is disposed on the second supporting body 81 such that the roller 88 is rotatable about an axis parallel to the Y-axis and is in contact with the contact body 82. One end of the second supporting body 81 on the positive Y-axis direction side (right side end, as viewed in FIG. 16) and one end of the first supporting body 86 on the positive Y-axis direction side (right side end, as viewed in FIG. 16) are pulled to each other by the coil spring 84 in the Z-axis direction. This makes it possible to bring the vibration element 83 into contact with the contact body 82 with a predetermined pressure force applied from the first supporting body 86 via the pressure transfer member 90 and the cushioning member 89. Here, felt, for example, is used for the cushioning member 89, and the cushioning member 89 serves to uniformly apply the pressure force to the vibration element 83.

When vibration is excited in the vibration element 83 to thereby generate a frictional drive force acting between the vibration element 83 and the contact body 82 in the X-axis direction, the support shaft 85 and the contact body 82 do not move, but the other members move in the X-axis direction in unison. According to the vibration actuator 80, the coil spring 84 is disposed at the end in the Y-axis direction, and hence it is possible to reduce the length of structure in the X-axis direction except the support shaft 85 and the contact body 82.

However, in the vibration actuator 80, since the cushioning member 89 is compressed by receiving the pressure force, the thickness of the cushioning member 89 can be changed. Further, the vibration actuator 80 has a structure in which the vibration element 83 is rotatable about the support shaft 85. Therefore, if the cushioning member 89 is compressed such that the thickness thereof varies in the Y-axis direction, the vibration element 83 is tilted with respect to the contact body 82 (so-called rotation in the roll direction), and hence there is a possibility that desired driving performance cannot be obtained. Further, to obtain desired characteristics when driving the vibration actuator, it is also required that the contact state between the contact body and the vibration element is properly set in the initial state. To cope with these problems, an arrangement which makes it possible to adjust the position of the vibration element with respect to the contact body is required.

SUMMARY OF THE INVENTION

The present invention provides a vibration actuator that is capable of adjusting the position of a vibration element with respect to a contact body.

In a first aspect of the present invention, there is provided a vibration actuator including a vibration element unit and a contact body, which are capable of relative movement to each other, wherein the vibration element unit comprises a first vibration element that is in contact with the contact body, an urging unit configured to bring the first vibration element and the contact body into contact with each other with predetermined pressure force, a first holding member that holds the first vibration element, a base, a first supporting member that slidably supports the first holding member in a pressing direction in which the first vibration element is pressed against the contact body, and a first connection member that is rotatably connected to the first supporting member, and is rotatably connected to the base about an axis parallel to a direction of the relative movement.

In a second aspect of the present invention, there is provided a vibration actuator including a vibration element unit and a contact body y, which are capable of relative movement to each other, wherein the vibration element unit comprises a first vibration element that is in contact with the contact body, an urging unit configured to bring the first vibration element and the contact body into contact with each other with predetermined pressure force, a first holding member that holds the first vibration element, a first supporting member that slidably supports the first holding member in a direction in which the first vibration element is pressed against the contact body, and an adjustment unit configured to adjust the position of the first vibration element with respect to the first supporting member in the pressing direction.

In a third aspect of the present invention, there is provided an apparatus including the vibration actuator, and a component driven by the vibration actuator.

According to the present invention, it is possible to provide the vibration actuator that is capable of adjusting the position of the vibration element with respect to the contact body.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
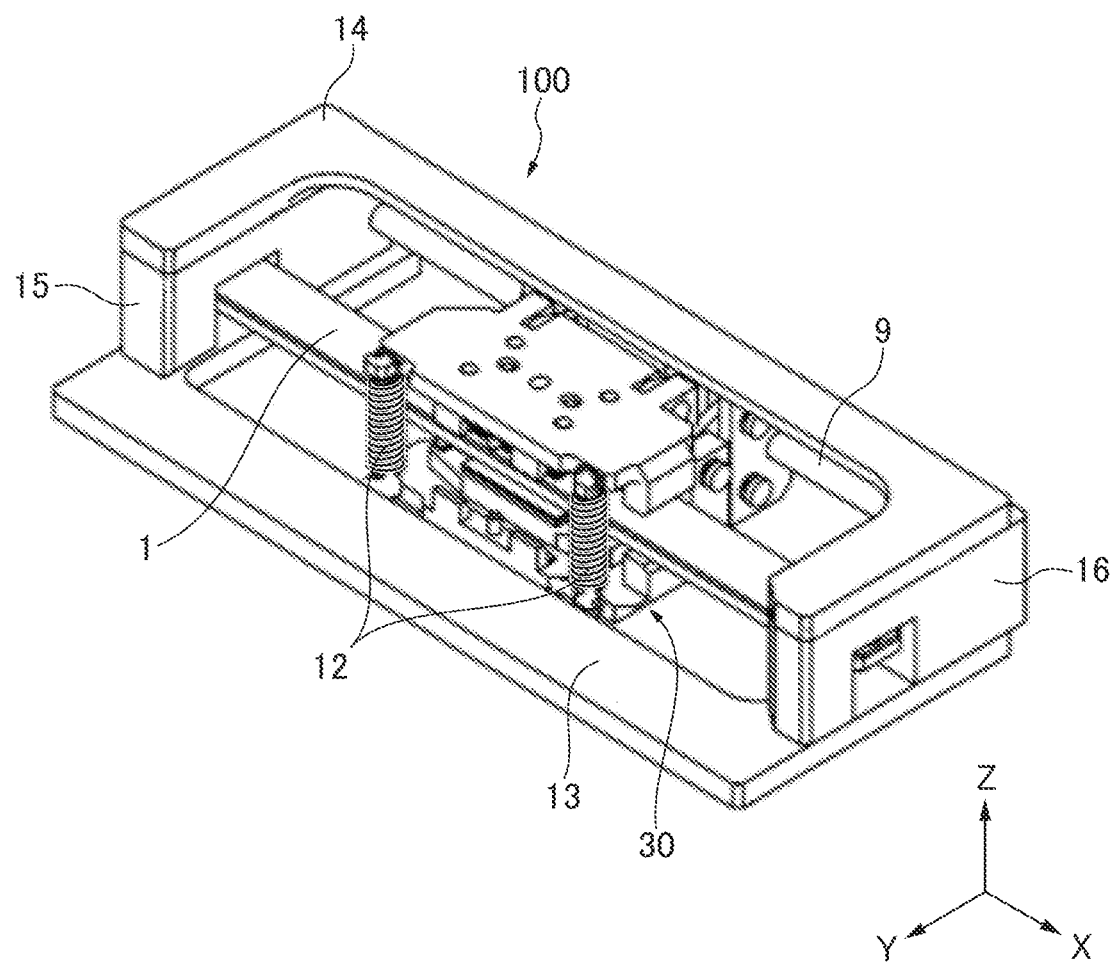
FIG. 1 is a perspective view showing the general arrangement of a vibration actuator according to a first embodiment.

FIG. 1 is a perspective view showing the general arrangement of a vibration actuator 100 according to a first embodiment. An X-axis, a Y-axis, and a Z-axis, which are orthogonal to each other, are defined as shown in FIG. 1 for convenience of explanation. As described hereinafter, the X-axis direction is a moving direction of a vibration element unit 30. The Z-axis direction is a direction orthogonal to (intersecting with) friction sliding surfaces of a contact body 1 in slide contact with vibration elements 2a and 2b, respectively. The Y-axis direction is a direction orthogonal (intersecting with) to the X-axis direction and the Z-axis direction.

The "contact body" refers to a member which is brought into contact with the vibration element, and is moved relative to the vibration element by vibration excited in the vibration element. The contact between the contact body and the vibration element is not limited to direct contact without any other member interposed between the contact body and the vibration element. The contact between the contact body and the vibration element may be indirect contact with another member disposed between the contact body and the vibration element, insofar as the contact body is moved relative to the vibration element by vibration excited in the vibration element. The "other member" is not limited to a member separate from the contact body and the vibration element (such as a high friction material formed of a sintered body). The "other member" may be a surface-treated portion of the contact body or the vibration element, formed e.g. by plating or nitriding.

The vibration actuator 100 includes the vibration element unit 30, the contact body 1, two support shafts 9, a bottom plate 13, a top plate 14, and side wall members 15 and 16. The side wall members 15 and 16 are erected and fixed to opposite ends of the bottom plate 13 in the X-axis direction, respectively. Respective opposite ends of the two support shafts 9 and the contact body 1 are fixed to the side wall members 15 and 16 such that the longitudinal directions of the two support shafts 9 and the contact body 1 are parallel to the X-axis. Note that one of the two support shafts 9 is not shown in FIG. 1, because the one support shaft 9 is hidden by the top plate 14.

The top plate 14 is fixed to the side wall members 15 and 16 such that the top plate 14 and the bottom plate 13 sandwich the side wall members 15 and 16. The vibration element unit 30 is supported on the two support shafts 9 such that the vibration element unit is movable in the X-axis direction. The vibration actuator 100 has a structure in which the vibration element unit 30 is moved relative to the contact body 1 along the support shafts 9 in the X-axis direction.

Figure 2:
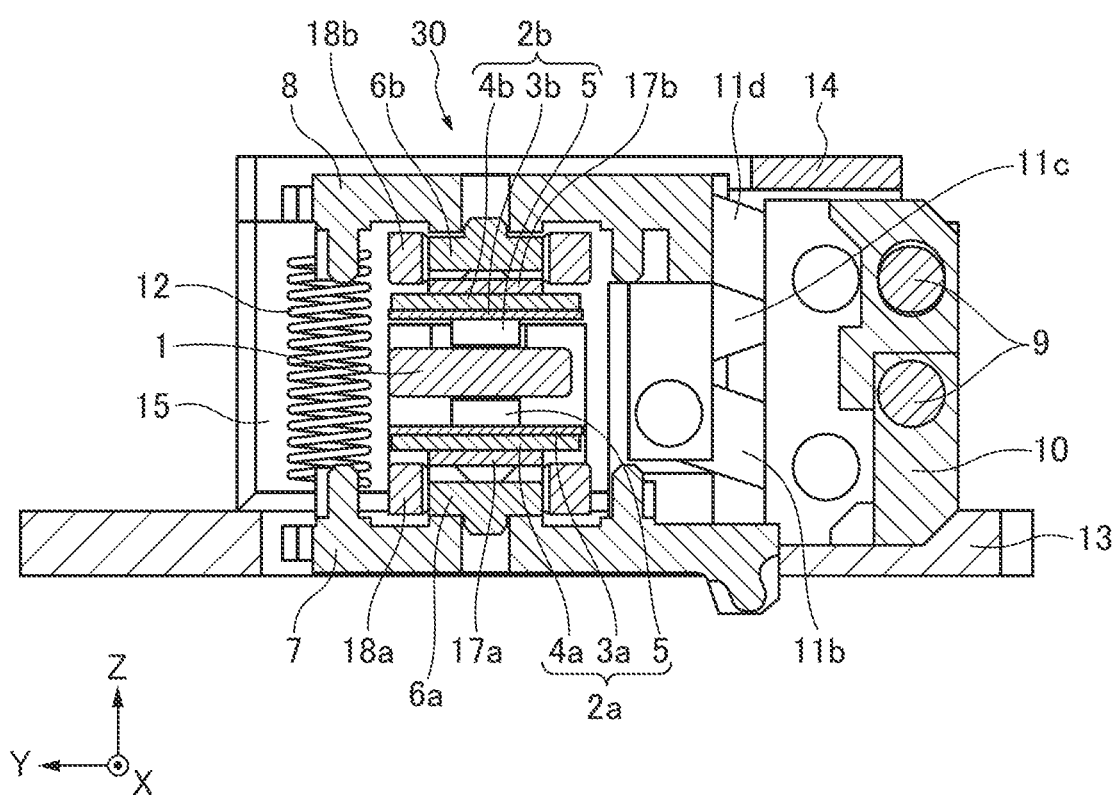
FIG. 2 is a cross-sectional view showing the general arrangement of the vibration actuator according to the first embodiment.

FIG. 2 is a cross-sectional view of the vibration actuator 100, showing a cross-section orthogonal to the X-axis, which is cut substantially at the center of the vibration element unit 30 in the X-axis direction. The vibration element unit 30 includes the vibration elements 2a and 2b, cushioning members 17a and 17b, holding members 18a and 18b, pressure transfer members 6a and 6b, a first supporting member 7, and a second supporting member 8. Further, the vibration element unit 30 includes a unit base 10 (base), connection members 11a, 11c, 11b, and 11d, and two tension coil springs 12.

In the vibration element unit 30, the vibration elements 2a and 2b sandwich the contact body 1 in the Z-axis direction, and surfaces of the contact body 1, orthogonal to the Z-axis, form the friction sliding surfaces brought into slide contact with the vibration elements 2a and 2b, respectively. The vibration elements 2a and 2b include elastic bodies 3a and 3b each having a flat plate shape, and piezoelectric elements 4a and 4b each having a flat plate shape, which are bonded to the elastic bodies 3a an 3b, respectively. Surfaces of the elastic bodies 3a and 3b, opposite from the surfaces to which the piezoelectric elements 4a and 4b are bonded, respectively, are each formed with two protrusions 5 (see FIG. 3) at a predetermined interval in the X-axis direction. Although details are described hereinafter, the vibration element 2a is held by the holding member 18a, and the vibration element 2b is held by the holding member 18b.

Although the connection member 11a is not shown in FIG. 2, the first supporting member 7 is connected to the unit base 10 via the connection members 11a and 11c, and the second supporting member 8 is connected to the unit base 10 via the connection members 11b and 11d. The unit base 10 is fitted on the support shafts 9 such that the unit bases 10 is movable in the X-axis direction. The arrangement and function of the connection members 11a to 11d will be described in detail hereinafter.

The urging force of the two tension coil springs 12 generates, between the first supporting member 7 and the second supporting member 8, pressure force for pressing the vibration elements 2a and 2b against the contact body 1 in the Z-axis direction via the pressure transfer members 6a and 6b and the cushioning members 17a and 17b. That is, the urging force generated by the tension coil springs 12 is applied from the first supporting member 7 to the vibration element 2a via the pressure transfer member 6a and the cushioning member 17a in the positive Z-axis direction as the pressing direction. Similarly, the urging force generated by the tension coil springs 12 is applied from the second supporting member 8 to the vibration element 2b via the pressure transfer member 6b and the cushioning member 17b in the negative Z-axis direction as the pressing direction. With this pressure force, the vibration elements 2a and 2b are always maintained in a state pressed against the contact body 1 in the Z-axis direction. Although the tension coil spring 12 is used in the vibration element unit 30 as urging means, any other urging means, such as rubber, may be used to press the vibration element insofar as it has the same function.

Figure 3:
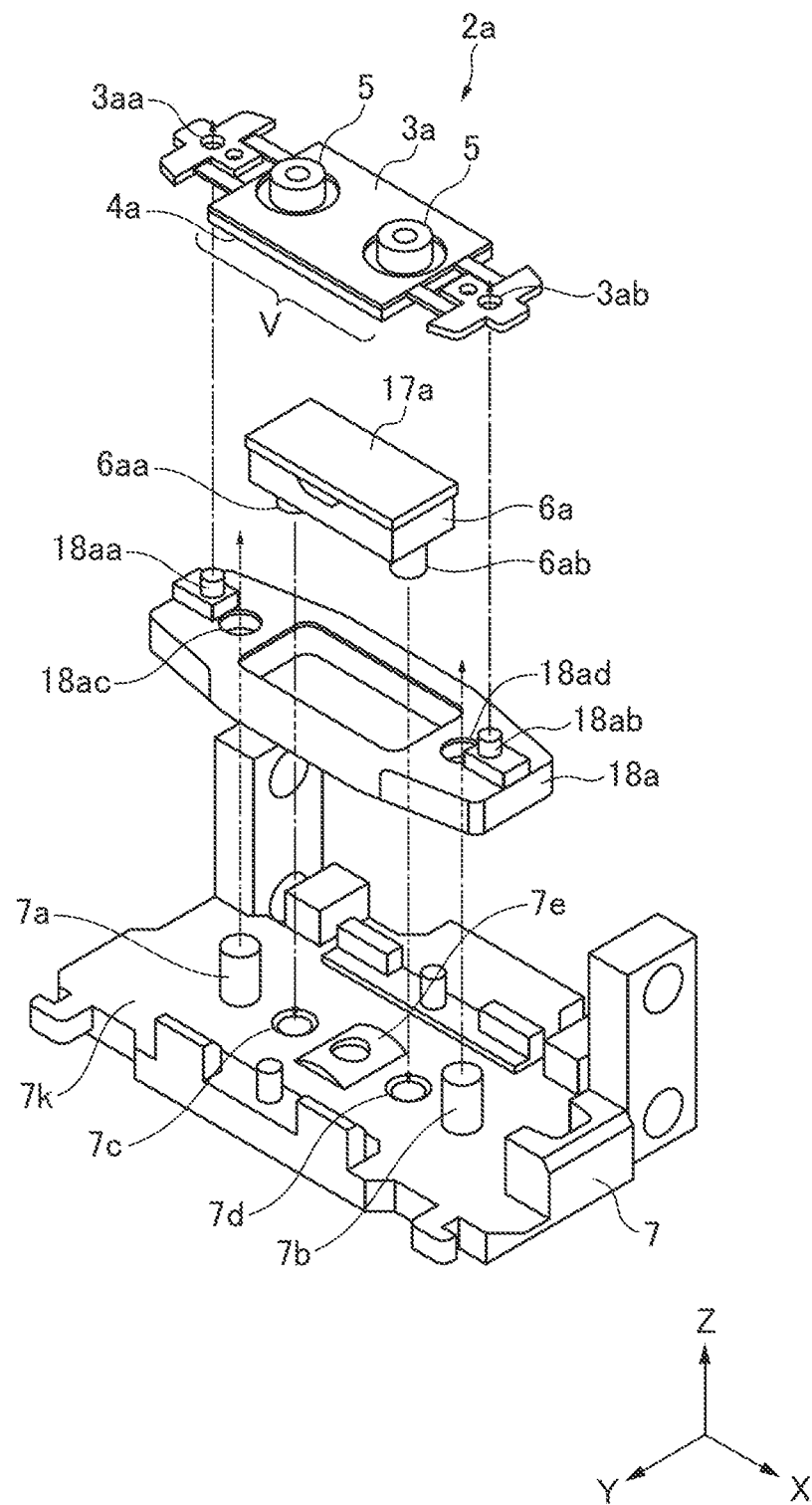
FIG. 3 is a partial exploded perspective view of a vibration element unit in the first embodiment.

FIG. 3 is a partial exploded perspective view of the vibration element unit 30, showing the arrangement in which the first supporting member 7 supports the vibration element 2a. Note that the arrangement in which the second supporting member 8 supports the vibration element 2b is substantially the same as the arrangement in which the first supporting member 7 supports the vibration element 2a, and hence illustration and description thereof are omitted.

The elastic body 3a has the X-axis direction as the longitudinal direction, and has a rectangular portion in the central portion thereof. One of surfaces of the rectangular portion is provided with the protrusions 5 and the other of the same has the piezoelectric element 4a bonded thereto. In the following description, part of the vibration element 2a, including the rectangular portion of the elastic body 3a, the protrusions 5, and the piezoelectric element 4a, is referred to as the vibration section V of the vibration element 2a, and although not shown, the same is applied to the vibration element 2b.

Here, the driving principle of the vibration elements 2a and 2b will be described with reference to FIGS. 4A to 4C. Note that in FIGS. 4A to 4C, the vibration element 2a or 2b, the elastic body 3a or 3b, and the piezoelectric element 4a or 4b are denoted as the vibration element 2, the elastic body 3, and the piezoelectric element 4, respectively, and the description with reference to FIGS. 4A to 4C is given using these reference numerals.

Figure 4A:
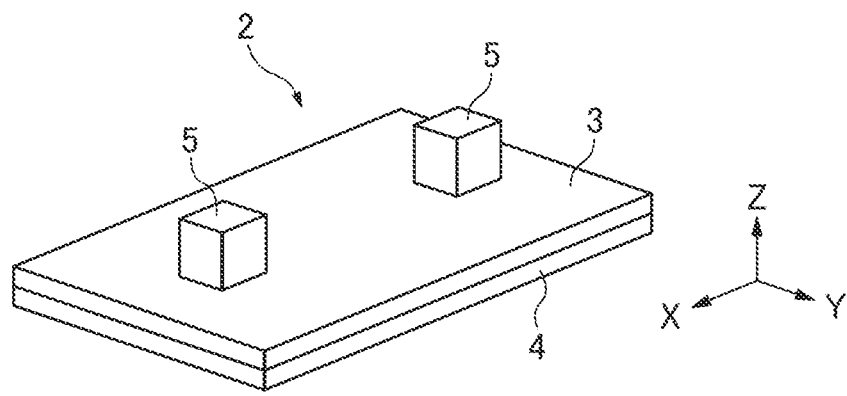
FIGS. 4A to 4C are views useful in explaining vibration modes of a vibration element included in the vibration element unit.
Figure 4B:
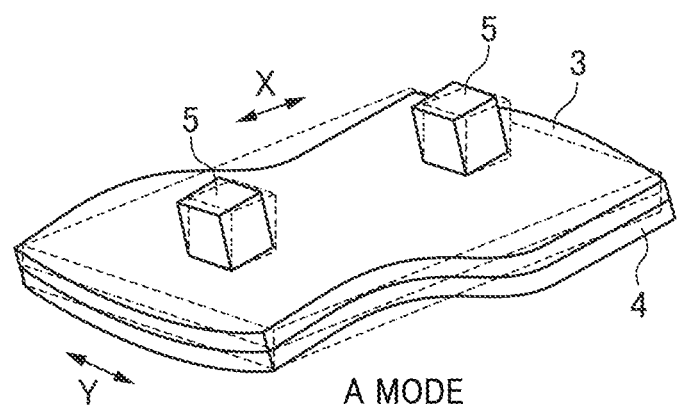
Figure 4C:
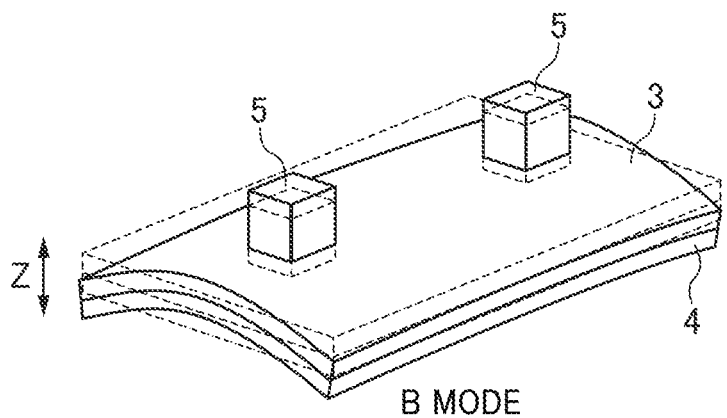

FIGS. 4A to 4C each show only the vibration section V of the vibration element 2. FIG. 4A is a perspective view showing the vibration element 2 in a simplified manner. FIG. 4B is a view useful in explaining a first vibration mode (hereinafter referred to as the "A mode") out of two bending vibration modes excited in the vibration element 2. The A mode is a mode of secondary bending vibration in the longitudinal direction (X-axis direction) of the vibration element 2, and has three node lines substantially parallel to the transverse direction (Y-axis direction) of the vibration element 2. Each protrusion 5 is disposed in the vicinity of a position corresponding to a node in the A mode of vibration and performs reciprocating motion in the X-axis direction when the A mode of vibration is excited in the vibration element 2.

FIG. 4C is a view useful in explaining a second vibration mode (hereinafter referred to as the "B mode") out of the two bending vibration modes excited in the vibration element 2. The B mode is a mode of primary bending vibration in the transverse direction (Y-axis direction) of the vibration element 2, and has two node lines substantially parallel to the longitudinal direction (X-axis direction) of the vibration element 2. Each protrusion 5 is arranged in the vicinity of a position corresponding to an antinode in the B mode of vibration, and performs reciprocating motion in an axial direction (Z-axis direction) of the protrusion 5 when the B mode of vibration is excited in the vibration element 2.

Here, the vibration element 2 is configured such that the node lines in the A mode of vibration and the node lines in the B mode of vibration are substantially orthogonal to each other within an X-Y plane. Therefore, by exciting the A mode of vibration and the B mode of vibration with a predetermined phase difference, it is possible to cause the tip ends of the protrusions 5 to perform elliptical motion within a Z-X plane to thereby apply the frictional driving force (thrust) in the X-axis direction to the contact body 1 (not shown in FIGS. 4A to 4C, see e.g. FIG. 2B). Note that a flexible circuit board, not shown, is bonded and connected to the piezoelectric element 4, and by supplying AC current to the piezoelectric element 4 via the flexible circuit board, it is possible to simultaneously excite the A mode of vibration and the B mode of vibration in the vibration element 2. The vibration element unit 30 is assembled in the vibration actuator 100 such that the directions of the X-axis, the Y-axis, the Z-axis of the vibration element 2 coincide with the directions of the X-axis, the Y-axis, the Z-axis of the vibration actuator 100, respectively.

The description with reference to FIG. 3 is resumed. The elastic body 3a is formed with two arm portions extending from the vibration section V of the vibration element 2a in the positive X-axis direction and the negative X-axis direction, respectively, and one of the arm portions is formed with a fitting hole 3aa, and the other of them is formed with a fitting hole 3ab. Protrusions 18aa and 18ab formed on opposite ends of the holding member 18a in the X-axis direction are fitted in and bonded to the fitting holes portions 3aa and 3ab, respectively, whereby the vibration element 2a is held on the holding member 18a in a state positioned with respect to the same. Here, although as the fixing method, the method of fitting the protrusions 18aa and 18ab in the fitting holes 3aa and 3ab and bonding them is used, any other fixing method, such as only by bonding or by welding, may be used.

The holding member 18a is formed therethrough with holes 18ac and 18ad in the Z-axis direction, and protruding portions 7a and 7b formed on the first supporting member 7 are slidably inserted in the holes 18ac and 18ad in the Z-axis direction, respectively. With this, the holding member 18a is slidable in the Z-axis direction, but is restricted from moving in the X-axis direction and the Y-axis direction with respect to the first supporting member 7.

The cushioning member 17a is a member for dispersing pressure force applied from the pressure transfer member 6a to the vibration element 2a, and is attached to the pressure transfer member 6a e.g. by bonding. As the cushioning member 17a, felt, for example, can be used. The pressure transfer member 6a is provided with protruding portions 6aa and 6ab on a surface opposite from the surface to which the cushioning member 17a is attached. The protruding portions 6aa and 6ab are inserted in holes 7c and 7d formed in the first supporting member 7, whereby the pressure transfer member 6a is positioned in the X-axis direction and the Y-axis direction with respect to the first supporting member 7 (restricted from moving in the X-axis direction and the Y-axis direction). Further, the surface of the pressure transfer member 6a, formed with the protruding portions 6aa and 6ab, is brought into contact with an arc-shaped curved surface of a convex portion 7e formed on the first supporting member 7, whereby the pressure transfer member 6a is positioned in the Z-axis direction.

With this arrangement, the vibration element 2a, the cushioning member 17a, the pressure transfer member 6a, and the holding member 18a are supported by the first supporting member 7 in a state restricted from moving in the X-axis direction and the Y-axis direction with respect to each other. Similarly to this, the vibration element 2b, the cushioning member 17b, the pressure transfer member 6b, and the holding member 18b are supported by the second supporting member 8 in a state restricted from moving in the X-axis direction and the Y-axis direction with respect to each other.

In the vibration element unit 30, when a surface 7k of the first supporting member 7, supporting the vibration element 2a via the holding member 18a, and the friction sliding surfaces of the contact body 1 are maintained in a state parallel to each other, the vibration element 2a is stabilized in an ideal posture with respect to the contact body 1. The surface 7k of the first supporting member 7, supporting the vibration element 2a, refers to a surface which is opposed to the contact body 1 in the Z-axis direction and is formed with the protruding portions 7a and 7b, and the holes 7c and 7d.

Similarly, when a surface of the second supporting member 8, supporting the vibration element 2b via the holding member 18b, and the friction sliding surfaces of the contact body 1 are maintained in a state parallel to each other, the vibration element 2b is stabilized in an ideal posture with respect to the contact body 1. Definition of the surface of the second supporting member 8, supporting the vibration element 2b, conforms to the definition of the surface 7k of the first supporting member 7, supporting the vibration element 2a. The ideal posture can be referred to as the posture in which the surfaces of the elastic bodies 3a and 3b of the vibration sections V are parallel to the friction sliding surfaces of the contact body 1, and can also be referred to as the posture in which the component of the pressure force for pressing the protrusions 5 against the contact body L can be substantially regarded as zero in the X-axis direction and the Y-axis direction. By holding the vibration elements 2a and 2b in the ideal posture with respect to the contact body 1, it is possible to drive the vibration actuator 100 while exploiting the full potential thereof.

Figure 5A:
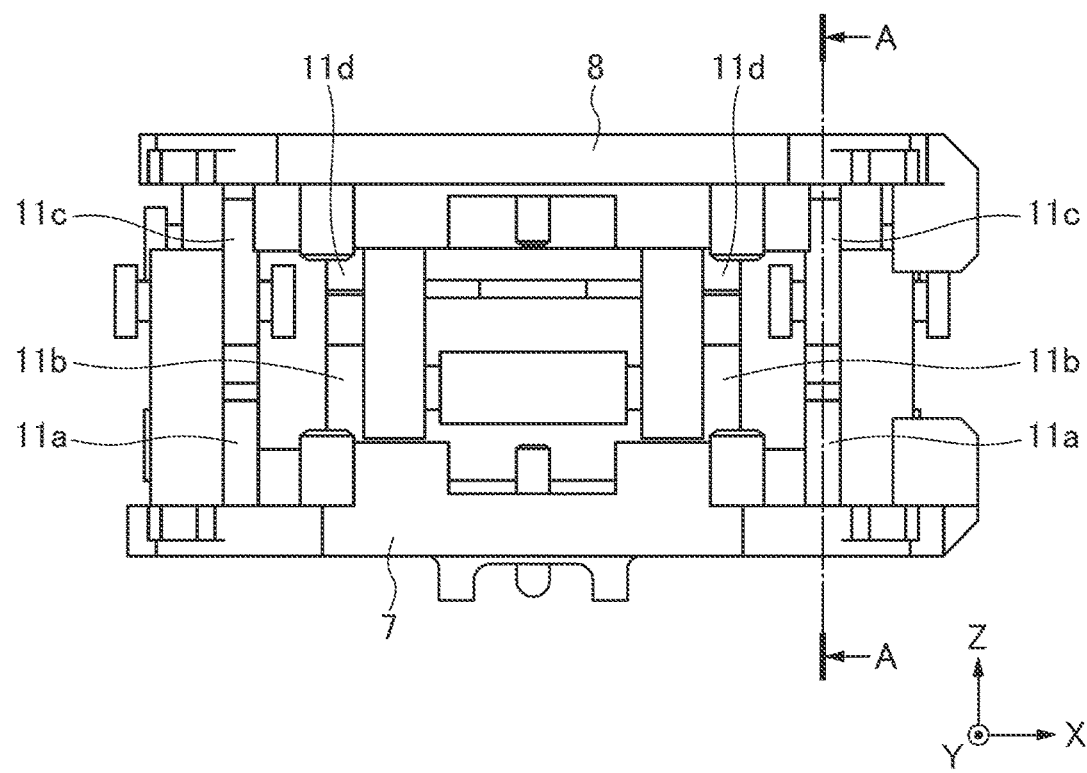
FIGS. 5A and 5B are views useful in explaining a mechanism for holding the posture of the vibration element with respect to a contact structure in the vibration actuator according to the first embodiment.
Figure 5B:
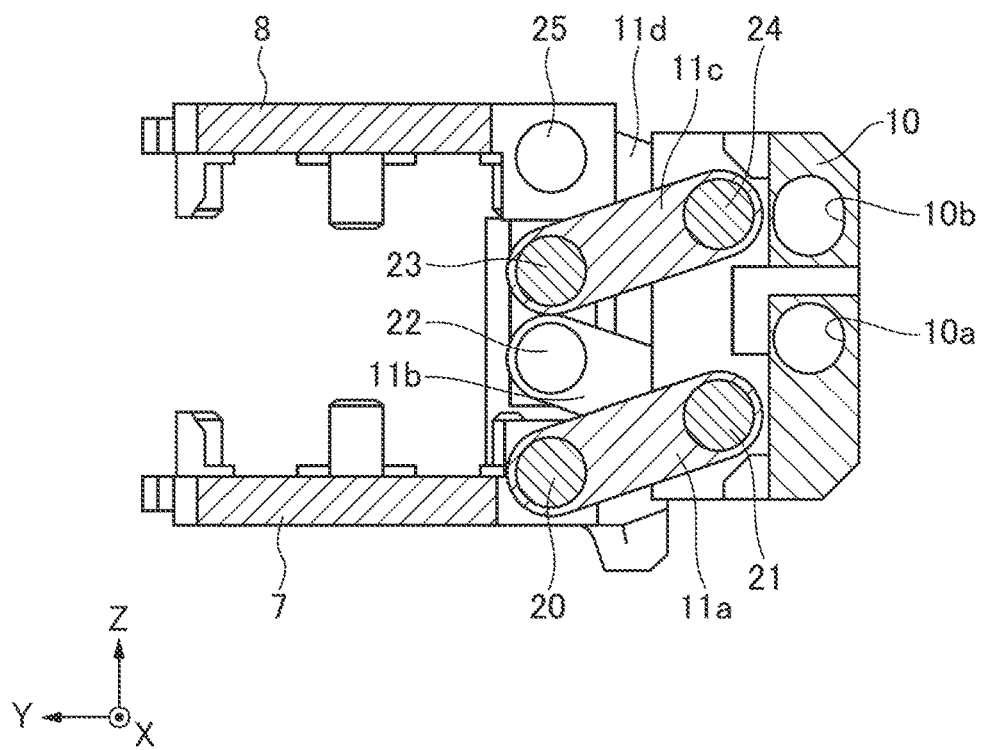

Next, a parallel link mechanism as a posture adjustment mechanism for holding the vibration elements 2a and 2b in the ideal posture with respect to the contact body 1 will be described. FIG. 5A is a side view (as viewed from the positive Y-axis direction side) of the vibration element unit 30. FIG. 5B is a cross-sectional view taken along A-A in FIG. 5A. Note that in FIGS. 5A and 5B, the members concerning adjustment of the posture of the vibration elements 2a and 2b are extracted for illustration, and the members other than these are not shown.

The support shafts 9 (see FIGS. 1 and 2) are slidably inserted through holes 10a and 10b formed in the unit base 10, respectively, and this enables the unit base 10 to move in the X-axis direction which is the longitudinal direction of the support shafts 9. Further, by inserting the two support shafts 9 through the holes 10a and 10b, the unit base 10 is restricted from rotating about the X-axis. Note that although the hole 10a is formed into a circular hole, the hole 10b is formed into an oval hole. With this, even when the two support shafts 9 tilt on an X-Z plane relative to each other, it is possible to prevent the support shaft 9 inserted through the hole 10b from becoming load on the support shaft 9 inserted through the hole 10a.

Note that although in the vibration actuator 100, the unit base 10 is restricted from rotating about the X-axis by using the two support shafts 9, the same effect can be obtained by using one support shaft, which is formed to have a polygonal cross-section. Further, a mechanism which enables smooth movement on a linear track, such as a linear guide, may be used in place of the support shaft.

The first supporting member 7 is supported on the unit base 10 via the connection members 11a and 11c. At this time, the first supporting member 7 and the connection member 11a are connected by first connection pins 20 such that they are rotatable about the X-axis relative to each other, and the connection member 11a and the unit base 10 are connected by second connection pins 21 such that they are rotatable about the X-axis relative to each other. Similarly, the first supporting member 7 and the connection member 11c are connected by fourth connection pins 23 such that they are rotatable about the X-axis relative to each other, and the connection member 11c and the unit base 10 are connected by fifth connection pins 24 such that they are rotatable about the X-axis relative to each other. Thus, the connection members 11a and 11c connect between the first supporting member 7 and the unit base 10 in a state in which the angles from the first supporting member 7 and the unit base 10 are variable.

A distance from the central axis of each first connection pin 20 to the central axis of each associated second connection pin 21 and a distance from the central axis of each fourth connection pin 23 to the central axis of each associated fifth connection pin 24 are designed to be equal to each other. Further, a distance from the central axis of each first connection pin 20 to the central axis of each associated fourth connection pin 23 and a distance from the central axis of each second connection pin 21 to the central axis of each associated fifth connection pin 24 are designed to be equal to each other. Thus, the parallel link is formed by the unit base 10, the first supporting member 7, and the connection members 11a and 11c.

Here, as described above, rotation of the unit base 10 about the X-axis is restricted. Therefore, for example, in a case where the connection member 11a rotates about the second connection pin 21 through a predetermined angle, the connection member 11c is also rotated by action of the parallel link mechanism, while maintaining the parallel state to the connection member 11a. Therefore, the first supporting member 7 can be displaced while maintaining the surface 7k of the first supporting member 7, supporting the vibration element 2a, and the friction sliding surfaces of the contact body 1 in the parallel state. Note that "the parallel state" used in the present description refers to a state which can be regarded as being substantially parallel, and it is not required to be strictly parallel. Further, "maintained in a parallel state" indicates that the state can be regarded as continuing to be a substantially parallel state.

Note that since FIG. 5B is the cross-sectional view, the first supporting member 7 appears to be supported by the two connection members 11a and 11c, but in actuality, as shown in FIG. 5A, the first supporting member 7 is supported by the two connection members 11a and the two connection members 11c. Therefore, rotation of the first supporting member 7 about the Y-axis (so-called rotation in a pitch direction) is restricted.

The second supporting member 8 is supported on the unit base 10 via the connection members 11b and 11d. At this time, the second supporting member 8 and the connection member 11b are connected by third connection pins 22 such that they are rotatable about the X-axis relative to each other, and the connection member 11b and the unit base 10 are connected by the second connection pins 21 such that they are rotatable about the X-axis relative to each other. Similarly, the second supporting member 8 and the connection member 11d are connected by sixth connection pins 25 such that they are rotatable about the X-axis relative to each other, and the connection member 11d and the unit base 10 are connected by the fifth connection pins 24 such that they are rotatable about the X-axis relative to each other. Thus, the connection members 11b and 11d connect between the second supporting member 8 and the unit base 10 in a state in which the angles from the second supporting member 8 and the unit base 10 are variable.

Thus, similarly to the case of the first supporting member 7, the parallel link is formed by the unit base 10, the second supporting member 8, and the connection members 11b and 11d. Therefore, the second supporting member 8 can also be displaced while maintaining the surface of the second supporting member 8, supporting the vibration element 2b, and the friction sliding surfaces of the contact body 1 in the parallel state.

Note that although in the vibration element unit 30, the common second connection pins 21 are used for connection between the connection members 11a and 11b and the unit base 10, the connection members 11a and 11b may be connected to the unit base 10 by different connection pins, respectively. Similarly, the connection members 11c and 11d may be connected to the unit base 10 by different connection pins, respectively.

The above description has been given assuming that the surface 7k of the first supporting member 7, supporting the vibration element 2a, and the friction sliding surfaces of the contact body 1 are parallel to each other. That is, the description has been given assuming that the surface of elastic body 3a in the vibration section V and the friction sliding surfaces of the contact body 1 are parallel to each other. However, there is no problem even when the surface 7k of the first supporting member 7, supporting the vibration element 2a, slightly tilts with respect to the friction sliding surfaces of the contact body 1, as viewed in a Y-Z plan view in FIG. 2 or FIGS. 5A and 5B. In other words, there is no problem even when the surface of the elastic body 3a in the vibration section V slightly tilts with respect to the friction sliding surfaces of the contact body 1. For example, it is empirically confirmed that if an angle formed by the surface of the elastic body 3a, which is formed with the protrusions 5, and the associated friction sliding surface of the contact body 1 is not larger than 2°, reduction of the relative speed between the vibration element unit 30 and the contact body 1 is small, and if the above-mentioned angle is not larger than 1°, reduction of the speed is not substantially caused. Therefore, the angle formed by the surface of the elastic body 3a in the vibration section V and the associated friction sliding surface of the contact body 1 is desirable to be not larger than 2°, and more desirable to be not larger than 10. The same is applied to a relationship between the surface of the second supporting member 8, supporting the vibration element 2b, and the associated friction sliding surface of the contact body 1 in sliding contact with the surface of the elastic body 3b, in the vibration section of the vibration element 2b.

As described above, in the vibration actuator 100, the surface 7k of the first supporting member 7, supporting the vibration element 2a, can be displaced while maintaining the parallel state to the friction sliding surfaces of the contact body 1 by using the parallel link mechanism. Similarly, the surface of the second supporting member 8, supporting the vibration element 2b, can also be displaced while maintaining the parallel state to the friction sliding surfaces of the contact body 1 by using the parallel link mechanism. Therefore, it is possible to hold the vibration elements 2a and 2b in the ideal posture with respect to the friction sliding surfaces of the contact body 1, whereby it is possible to drive the vibration actuator 200 while exploiting the full potential thereof.

Figure 16:
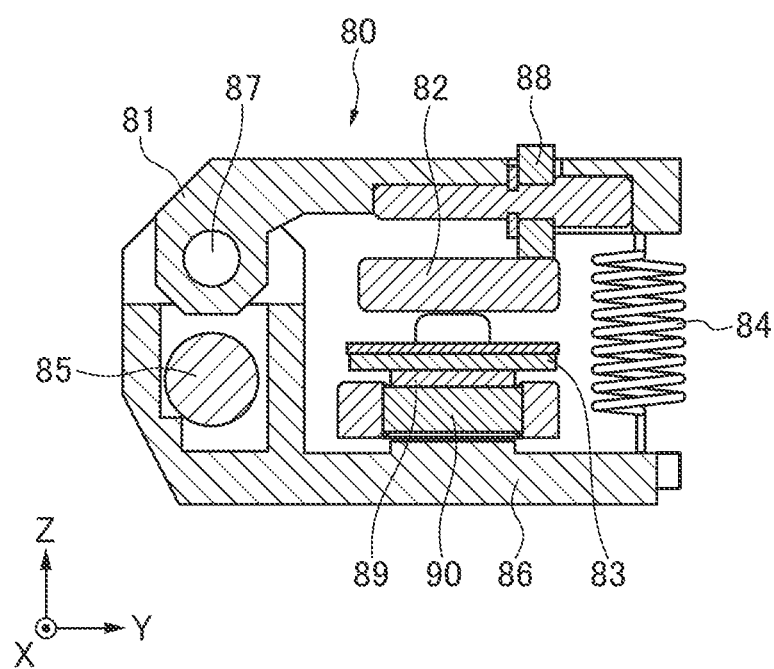
FIG. 16 is a side view showing a structure of a known vibration actuator.

Further, in the structure of the vibration actuator 80, described as the related art with reference to FIG. 16, when due to long-term use, compression of the cushioning member 89 by the pressure force results in reduced thickness thereof, there is a possibility that the cushioning member 89 becomes different in thicknesses between the positive Y-axis direction side and the negative Y-axis direction side due to the urging force applied by the tension coil spring 84. In this case, the frictional drive force applied to the contact body 82 by the vibration element 83 includes a Y-axis direction component, and a Z-axis direction component contributing to the relative movement between the vibration element 83 and the contact body 82 is reduced, which causes e.g.

lowering of the use efficiency of the frictional drive force. In contrast, in the vibration element unit 30, the surface 7k of the first supporting member 7, supporting the vibration element 2a, and the surface of the second supporting member 8, supporting the vibration element 2b, are maintained in the parallel state, and hence nonuniform compression of the cushioning members 17a and 17b is less liable to be caused. That is, the vibration element unit 30 has a structure in which the parallel state between the friction sliding surfaces of the contact body 1 and the surfaces of the elastic bodies 3a and 3b in the vibration sections V of the vibration elements 2a and 2b is maintained with time, and the use efficiency of the frictional drive force is less liable to be lowered.

Although the above description has been given of the arrangement in which the contact body 1 is fixed and the vibration element unit 30 is movable, the vibration actuator 100 can be configured such that the vibration element unit 30 is fixed and the contact body 1 is movable. Further, although the vibration element unit 30 is combined with the contact body 1 having a linear shape, the shape of the contact body 1 is not limited to the linear shape.

Figure 6:
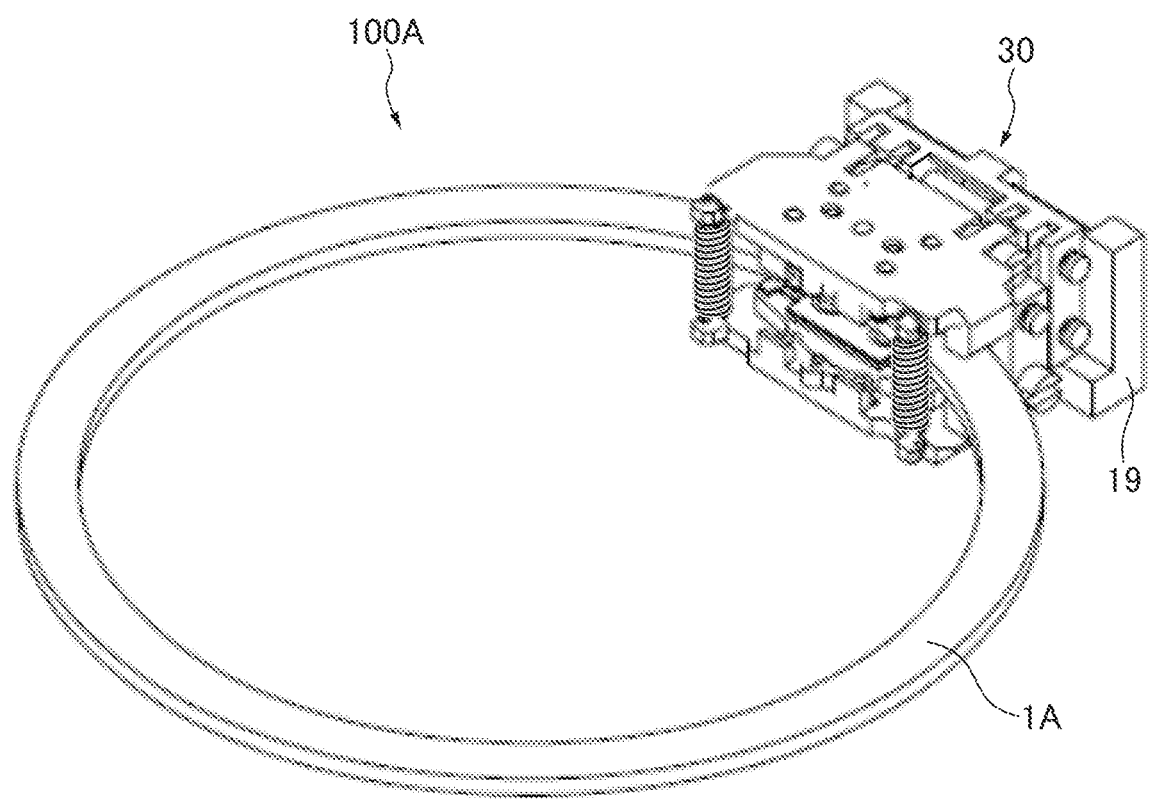
FIG. 6 is a perspective view showing the general arrangement of a vibration actuator as a variation of the first embodiment.

FIG. 6 is a perspective view showing the general arrangement of a vibration actuator 100A as a variation of the first embodiment, which is formed by combining a contact body 1A having an annual shape and the vibration element unit 30. The annular contact body 1A having an annual shape is arranged such that the contact body 1A is rotatable in a circumferential direction with respect to a guide, not shown. The vibration element unit 30 is fixed to a device frame 19 such that two surfaces of the contact body 1A, parallel to a radial direction, each form a friction sliding surface with respect to the vibration element unit 30. In the vibration actuator 100A, it is possible to rotate the contact body 1A in the circumferential direction by driving the two vibration elements 2a and 2b as described with reference to FIGS. 4A to 4C to cause the frictional drive force to act in the circumferential direction of the contact body 1A (tangential direction of the circumference). Note that the structure can be configured such that the contact body 1A is fixed and the vibration element unit 30 is movable along the circumference of the contact body 1A.

Figure 7:
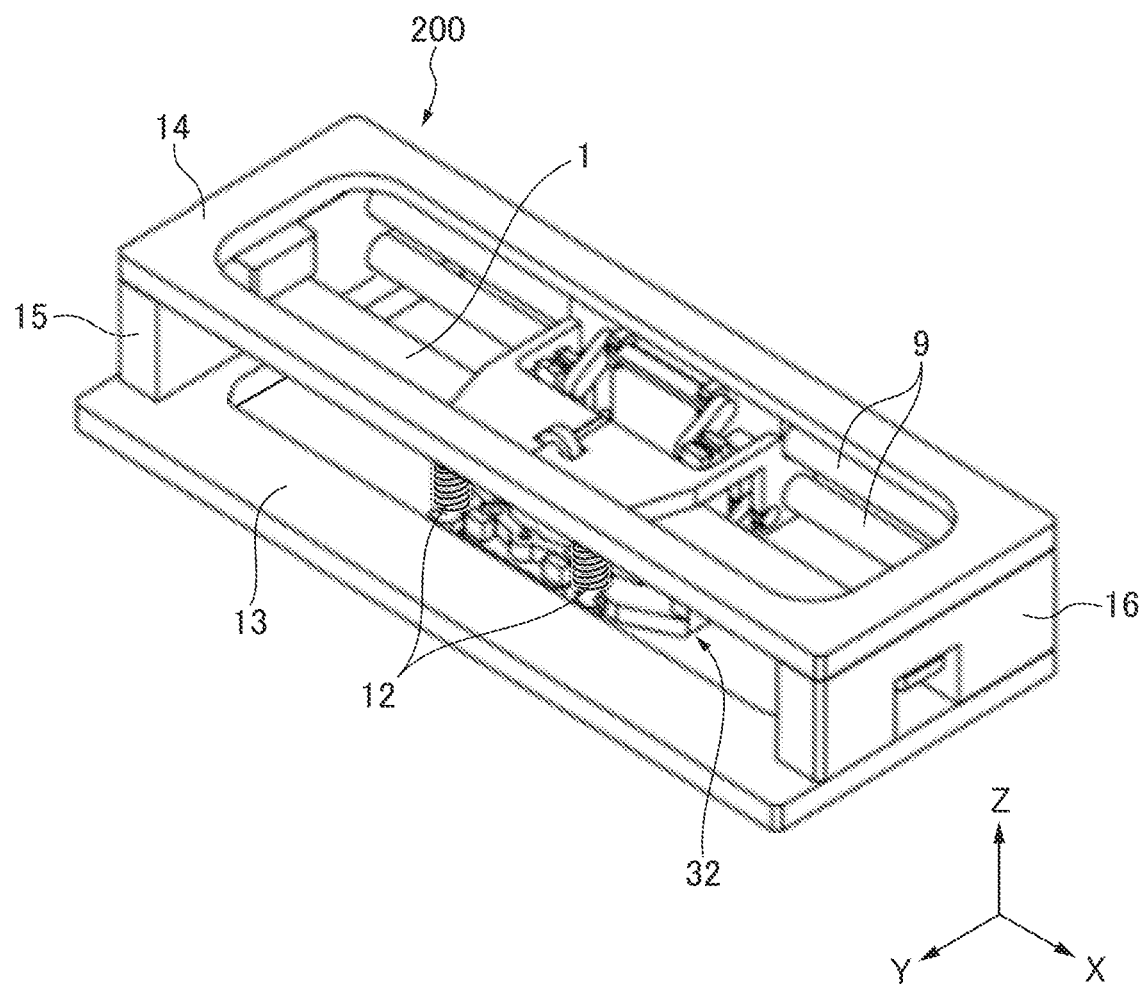
FIG. 7 is a perspective view showing the general arrangement of a vibration actuator according to a second embodiment.

Next, a description will be given of a second embodiment of the present invention. FIG. 7 is a perspective view showing the general arrangement of a vibration actuator 200 according to the second embodiment. Note that some of the component elements of the vibration actuator 200, which are substantially the same in function as those of the vibration actuator 100, are denoted by the same reference numerals, and redundant description is omitted.

The vibration actuator 200 includes a vibration element unit 32, the contact body 1, the two support shafts 9, the bottom plate 13, the top plate 14, and the side wall members 15 and 16. The vibration element unit 32 is supported on the two support shafts 9 such that the vibration element unit 32 is movable in the X-axis direction which is the longitudinal direction of the support shafts 9. The vibration actuator 200 has a structure in which the vibration element unit 32 moves relative to the contact body 1 in the X-axis direction.

Figure 8:
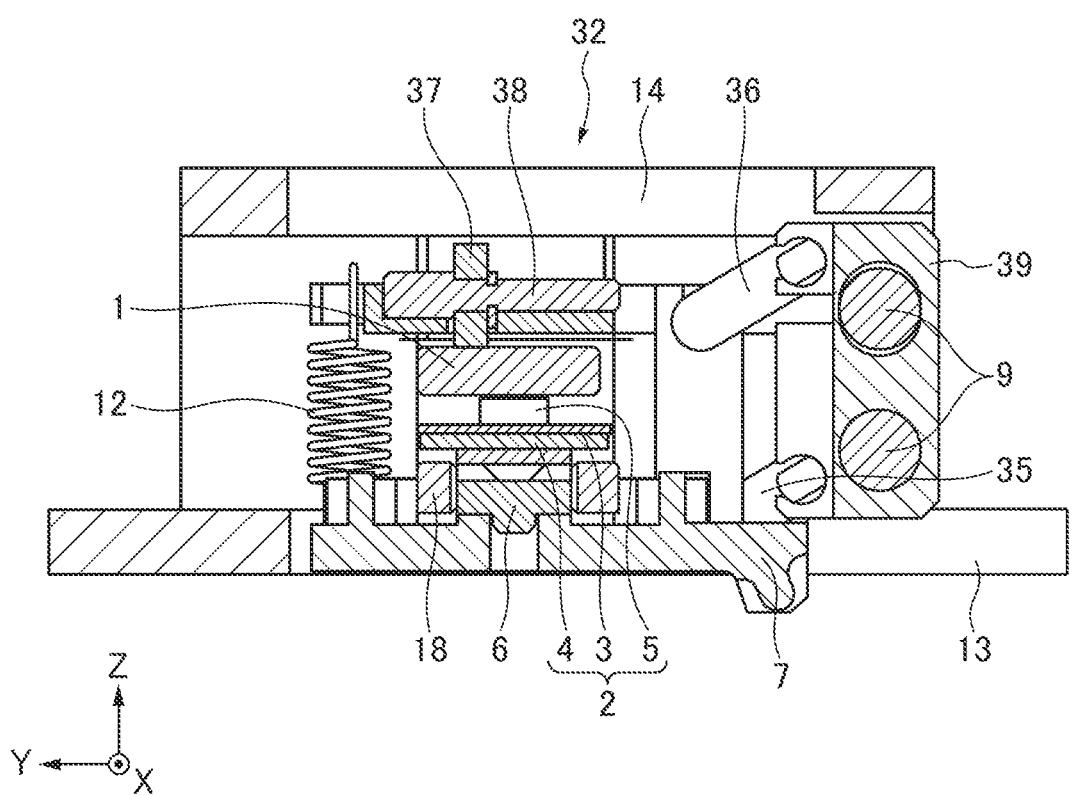
FIG. 8 is a cross-sectional view showing the general arrangement of the vibration actuator according to the second embodiment.

FIG. 8 is a cross-sectional view of the vibration actuator 200, showing a cross-section orthogonal to the X-axis, which is cut substantially at the center of the vibration element unit 32 in the X-axis direction. The vibration element unit 32 includes the vibration element 2, the cushioning member 17, a holding member 18, the pressure transfer member 6, the first supporting member 7, a unit base 39 (base), connection members 35 and 36, and the tension coil springs 12. The arrangement of the vibration element 2 is the same as that of the vibration element 2a described in the first embodiment, and includes the elastic body 3 formed with the protrusions and the piezoelectric element 4 bonded to the elastic body 3.

The support shafts 9 are slidably inserted through two holes (corresponding to the holes 10a and 10b of the unit base 10) formed in the unit base 39, and this enables the unit base 39 to move in the X-axis direction which is the longitudinal direction of the support shafts 9. Rotation of the unit base 39 about the X-axis is restricted by the two support shafts 9. Although the vibration element unit 30 of the first embodiment includes the two vibration elements 2a and 2b, the vibration element unit 32 of the second embodiment includes the one vibration element 2. Therefore, part of the vibration element unit 32, corresponding to the second supporting member 8 included in the vibration element unit 30 of the first embodiment (hereinafter referred to as the "second supporting member-corresponding part"), is formed integrally with the unit base 39. Further, the second supporting member-corresponding part of the unit base 39 is provided with a roller 37, and a rotation shaft 38 supporting the roller 37 such that the roller 37 is rotatable about the Y-axis so as to enable the unit base 39 to smoothly move with respect to the contact body 1. As the roller 37, a bearing, for example, can be used. However, since rotation of the unit base 39 about the X-axis is restricted, in a case where a distance between the contact body 1 and the second supporting member-corresponding part of the unit base 39 is large, the roller 37 is not required to be arranged.

Similar to the first embodiment, the first supporting member 7, the unit base 39, and the connection members 35 and 36 form the parallel link. As mentioned above, the structure of the vibration element 2 is the same as the structure of the vibration element 2a in the first embodiment. Further, the supporting structure of the vibration element 2 with respect to the first supporting member 7 is the same as the supporting structure of the vibration element 2a with respect to the first supporting member 7 in the first embodiment. Therefore, the first supporting member 7 is supported on the unit base 39 via the connection members 35 and 36 in a state in which the surface 7k of the first supporting member 7, supporting the vibration element 2, and the friction sliding surface of the contact body 1 are maintained in the parallel state.

The vibration actuator 200 configured to frictionally drive the contact body 1 by using the single vibration element 2 can also stabilize the posture of the vibration element 2 in a state in which the surface of the elastic body 3 in the vibration section V (see FIG. 3) of the vibration element 2 and the friction sliding surface of the contact body 1 are parallel to each other by using the parallel link. This makes it possible to stably obtain desired driving force. Further, compared with the vibration actuator 100, the vibration actuator 200 uses one vibration element, and hence it is possible to reduce the size of the vibration actuator.

Note that the vibration actuator 200 may also use e.g. rubber in place of the tension coil springs 12, as described in the first embodiment. Further, to restrict the unit base 39 from rotating about the X-axis, one support shaft having a quadratic prism-shape may be used in place of the two support shafts 9, or a linear guide may be used in place of the support shaft. Further, modifications, such as change to the arrangement in which the vibration element unit 32 is fixed and the contact body 1 is movable, or change of the shape or the like of the contact body, can also be made to the vibration actuator 200 according to the description in the first embodiment.

Figure 9:
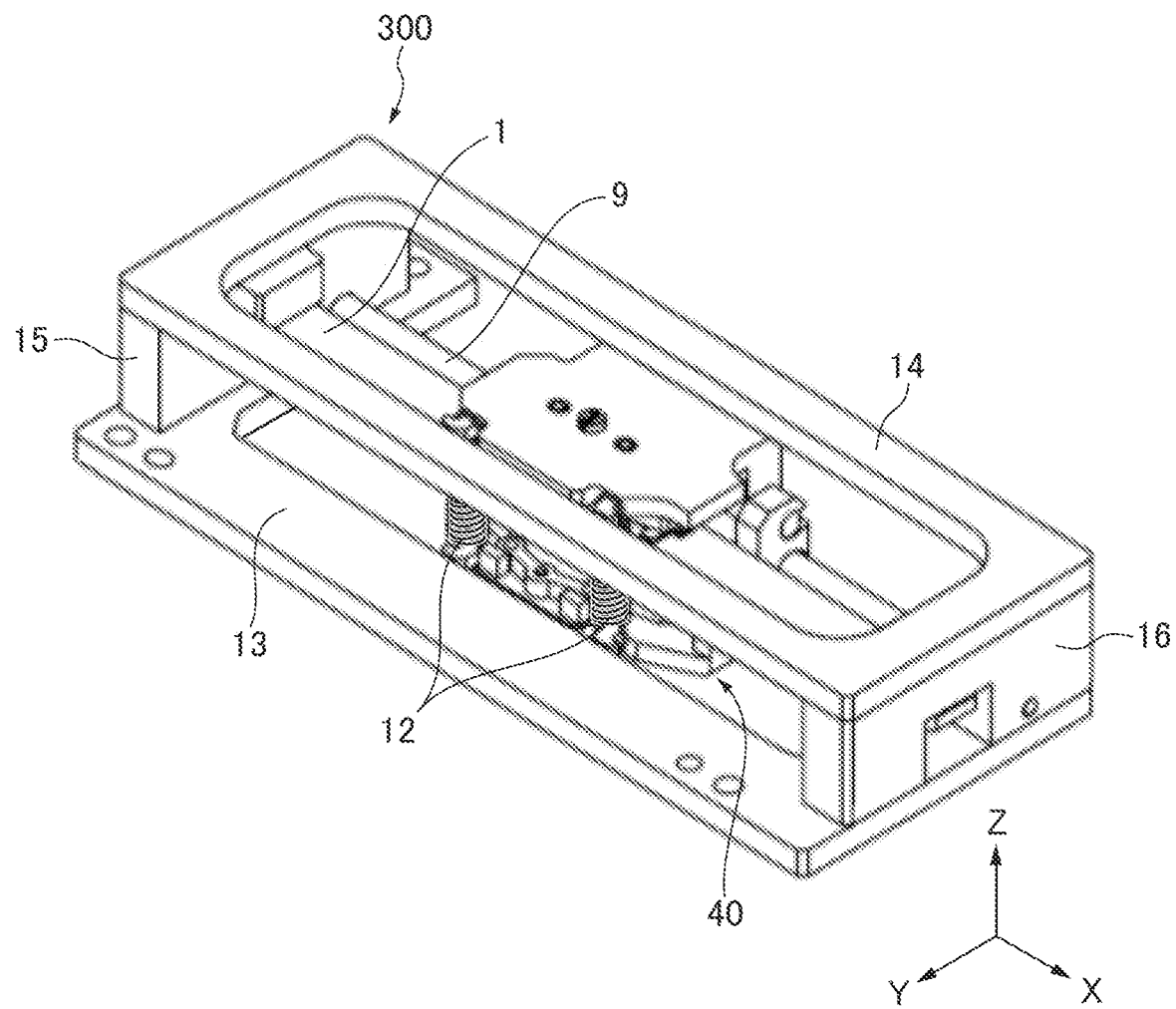
FIG. 9 is a perspective view showing the general arrangement of a vibration actuator according to a third embodiment.

Next, a description will be given of a third embodiment of the present invention. FIG. 9 is a perspective view showing the general arrangement of a vibration actuator 300 according to the third embodiment. Note that some of the component elements of the vibration actuator 300, which are substantially the same in function as those of the vibration actuator 100, are denoted by the same reference numerals, and redundant description is omitted.

The vibration actuator 300 includes a vibration element unit 40, the contact body 1, the one support shaft 9, the bottom plate 13, the top plate 14, and the side wall members 15 and 16. The vibration actuator 300 has a structure in which the vibration element unit 40 is supported on the support shaft 9 such that the vibration element unit 40 is movable in the X-axis direction which is the longitudinal direction of the support shaft 9, whereby the vibration element unit 40 is movable relative to the contact body 1 along the support shaft 9 in the X-axis direction.

Figure 10:
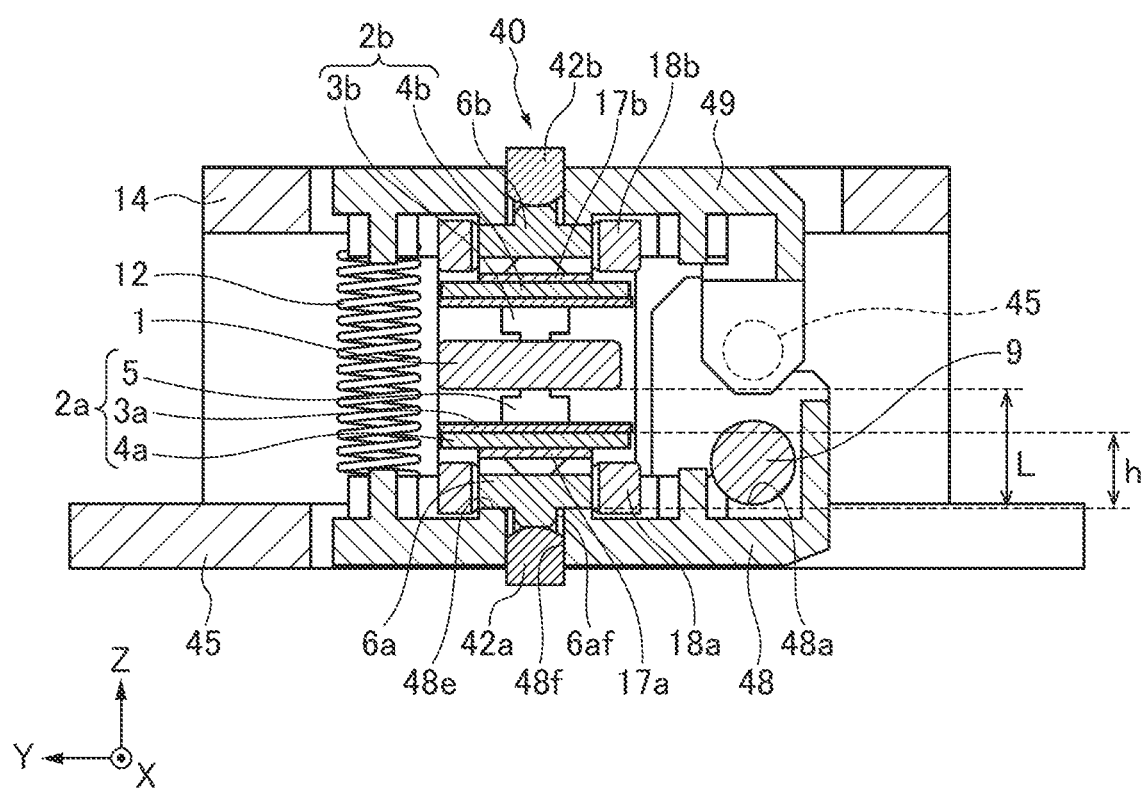
FIG. 10 is a cross-sectional view showing the general arrangement of the vibration actuator according to the third embodiment.

FIG. 10 is a cross-sectional view of the vibration actuator 300, showing a cross-section orthogonal to the X-axis, which is cut substantially at the center of the vibration element unit 40 in the X-axis direction. The vibration element unit 40 includes the vibration elements 2a and 2b, the cushioning members 17a and 17b, the pressure transfer members 6a and 6b, the holding members 18a and 18b, a first supporting member 48, a second supporting member 49, and the tension coil springs 12.

The support shaft 9 is slidably inserted through a hole 48a formed in the first supporting member 48, whereby the first supporting member 48 is made movable along the support shaft 9. The second supporting member 49 is provided with connection pins 45 in parallel to the X-axis direction, and the connection pins 45 are rotatably fitted in connection pin reception portions (not shown) formed in the first supporting member 48. Therefore, the second supporting member 49 is rotatable about the connection pins 45 (about the X-axis) with respect to the first supporting member 48. Respective end portions of the first supporting member 48 and the second supporting member 49 in the positive Y-axis direction (end portions on a side opposite from the side connected to the connection pins 45 in the Y-axis direction) are pulled to each other by the tension coil springs 12.

The arrangement of the vibration elements 2a and 2b, the cushioning members 17a and 17b, and the pressure transfer members 6a and 6b with respect to the holding members 18a and 18b conform to the corresponding description of the first embodiment (see FIG. 3). Therefore, the pressure force applied to the first supporting member 48 and the second supporting member 49 by the tension coil springs 12 is transferred only to the vibration elements 2a and 2b. Thus, similarly to the vibration element unit 30 of the first embodiment, the vibration elements 2a and 2b are held in a posture for applying the pressure force to the contact body 1 in the Z-axis direction, and the vibration element unit 40 is movable along the longitudinal direction of the support shaft 9 relative to the contact body 1 in unison.

Next, a mechanism for adjusting the position of the vibration element 2a with respect to the contact body 1 in the vibration actuator 300 will be described. The structure in which the first supporting member 48 supports the vibration element 2a is the same as the structure in which the first supporting member 7 supports the vibration element 2a in the first embodiment. That is, the vibration element 2a (elastic body 3a) is fitted and fixed on the holding member 18a by bonding, and the holding member 18a is made slidable only in the Z-axis direction with respect to the first supporting member 48 by pin-fitting. Therefore, the surface of the elastic body 3a in the vibration section V of the vibration element 2a is maintained in the parallel state to the surface of the first supporting member 48, supporting the vibration element 2a (surface corresponding to the surface 7k of the first supporting member 7 in the first embodiment (see FIG. 3)). Note that if the surface of the first supporting member 48, supporting the vibration element 2a, is parallel to the friction sliding surfaces of the contact body 1, the surface of the elastic body 3a in the vibration section V of the vibration element 2a is also parallel to the friction sliding surfaces of the contact body 1.

The surface of the pressure transfer member 6a, toward the first supporting member 48, is brought into contact with a convex portion 48e (corresponding to the convex portion 7e of the first supporting member 7 in the first embodiment) formed on the first supporting member 48, whereby the position of the pressure transfer member 6a in the Z-axis direction is determined. In this case, a height from the first supporting member 48 to the elastic body 3a forming the vibration element 2a, for example, a height "h" (see FIG. 10) to the surface of the elastic body 3a, to which the piezoelectric element 4a is bonded, is determined by the position of the pressure transfer member 6a and the position of the cushioning member 17a in the Z-axis direction. To adjust the position of the vibration element 2a with respect to the first supporting member 48 in the Z-axis direction, it is only required to adjust the position of the pressure transfer member 6a in the Z-axis direction.

In view of this, to make it possible to adjust the position of the pressure transfer member 6a, in the vibration element unit 40, the convex portion 48e formed on the first supporting member 48 is formed with a screw hole 48f, and a protrusion 6af to be inserted in the screw hole 48f is formed on the pressure transfer member 6a. An outer peripheral surface of the protrusion 6af is not formed with a screw groove, and therefore, the protrusion 6af is movable in the Z-axis direction with respect to the screw hole 48f without being screwed in the screw hole 48f. On the other hand, a set screw 42a is screwed in the screw hole 48f from the negative direction side of the Z-axis, and the amount of screwing the set screw 42a is adjusted (the position (height) brought into contact with the protrusion 6af in the Z-axis direction is adjusted). This makes it possible to adjust the position of the pressure transfer member 6a with respect to the first supporting member 48 in the Z-axis direction. Note that the set screw is also referred to as the lock screw, and the hollow screw. Taking into consideration that looseness between the respective contact surfaces of the tip end of the protrusion 6af and the tip end of the set screw 42a generates untoward noise, the tip end of the set screw 42a is formed into a spherical surface (curved surface) protruding toward the protrusion 6af.

The position of the pressure transfer member 6a in the Z-axis direction is adjusted by the set screw 42a, whereby the position of the vibration element 2a is also moved and adjusted in the Z-axis direction. That is, the height "h" of the vibration element 2a with respect to the first supporting member 48 is adjusted, and a distance "L" (see FIG. 10) between the contact body 1 and the first supporting member 48 is adjusted at the same time.

The adjustment of the respective positions of the pressure transfer member 6a and the vibration element 2a in the Z-axis direction by using the set screw 42a is performed when the vibration element unit 40 is assembled. Further, in a case where there the vibration actuator 300 is used for a long term, there is a possibility that compression of the cushioning member 17a results in reduced thickness thereof or wear of the contact body results in reduced thickness thereof. In this case, the position or posture of the vibration element 2a with respect to the contact body 1 is changed from the initial state. Even in this case, by adjusting the amount of screwing the set screw 42a into the screw hole 48f, it is possible to adjust the position of the vibration element 2a with respect to the first supporting member 48 in the Z-axis direction.

Note that the components on the side toward the second supporting member 49 are arranged similar to the components on the side toward the first supporting member 48, and by adjusting the amount of screwing a set screw 42b into the second supporting member 49 to thereby adjust the position of the pressure transfer member 6b in the Z-axis direction, it is possible to adjust the position of the vibration element 2b in the Z-axis direction. That is, by adjusting the amount of screwing the set screw 42b into the second supporting member 49, it is possible to adjust the height of the vibration element 2b with respect to the second supporting member 49, and adjust the position of the vibration element 2b with respect to the contact body 1 in the Z-axis direction at the same time.

As described above, in the vibration actuator 300, it is possible to adjust the positions of the vibration elements 2a and 2b with respect to the contact body 1 with the simple arrangement. Note that in the vibration actuator 300, rubber or the like may be also used place of the tension coil springs 12, as described in the first embodiment. Further, general screw members, such as screws with respective screw heads, may be used in place of the set screws 42a and 42b.

Figure 11:
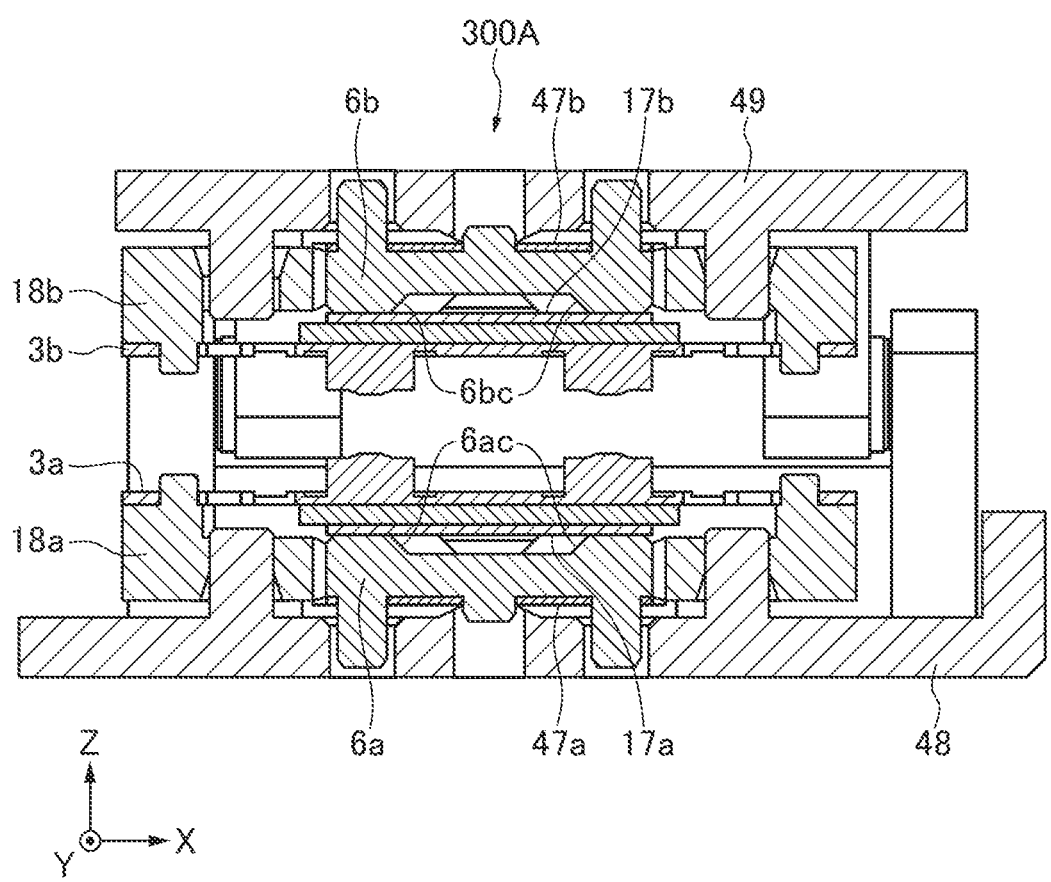
FIG. 11 is a cross-sectional view showing the general arrangement of a first variation of the vibration actuator according to the third embodiment.

Next, a description will be given of a first variation of the vibration actuator 300 according to the third embodiment will be described. FIG. 11 is a cross-sectional view showing the general arrangement of a vibration actuator 300A which is the first variation of the vibration actuator 300, showing a X-Z cross-section, which is cut substantially at the center of the vibration element unit 2 in the Y-axis direction. Note that in FIG. 11, members which are not directly related to the components for adjusting the positions of the vibration elements 2a and 2b in the Z-axis direction are omitted from illustration.

In the vibration actuator 300, the positions of the vibration elements 2a and 2b in the Z-axis direction are adjusted by using the set screws 42a and 42b. In contrast, in the vibration actuator 300A, a shim plate 47a (plate member) having a predetermined thickness is arranged between the first supporting member 48 and the pressure transfer member 6a in place of the set screw 42a. Similarly, a shim plate 47b is arranged between the second supporting member 49 and the pressure transfer member 6b in place of the set screw 42b. This makes it possible to position the vibration elements 2a and 2b in the Z-axis direction. Further, in the vibration actuator 300, if the set screw is loosened, there is a possibility that the positions of the vibration elements 2a and 2b in the Z-axis direction are changed, and further, the postures of the vibration elements 2a and 2b are changed. In contrast, in the vibration actuator 300A, it is possible to prevent occurrence of this problem by using the shim plates 47a and 47b.

Note that as shown in FIG. 11, the pressure transfer member 6a is formed with step portions 6ac at opposite end portions thereof in the X-axis direction, which rise toward the protrusions 5 formed on the elastic body 3a from a central portion thereof in the X-axis direction, such that the transfer member 6a is brought into contact with the cushioning member 17a, in areas thereof partially overlapping with the protrusions 5 of the elastic body 3a, as viewed from the Z-axis direction. This makes it possible to efficiently transfer the pressure force acting on the pressure transfer member 6a to the protrusions 5 of the elastic body 3a, whereby it is possible to perform driving with high efficiency. Note that similar to this, the pressure transfer member 6b is also formed with step portions 6bc at opposite end portions thereof in the X-axis direction. The pressure transfer members 6a and 6b, each having the above-mentioned shape, can be applied to the vibration element units, described in the first to third embodiments.

Figure 12A:
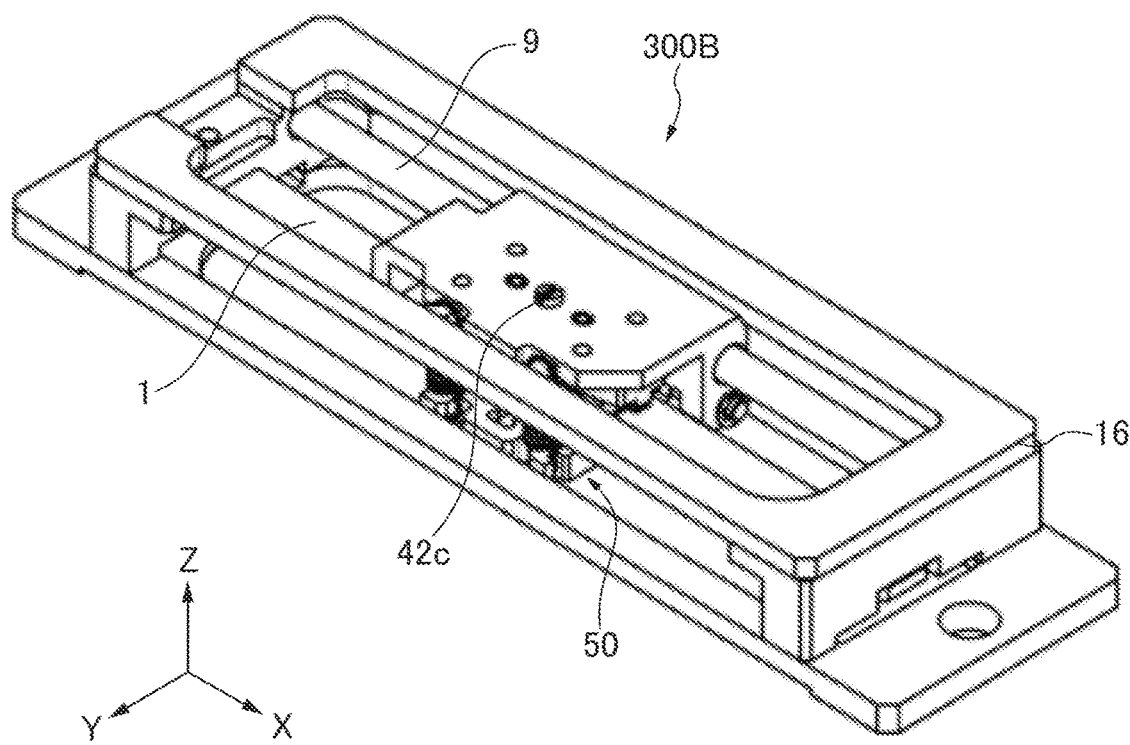
FIGS. 12A and 12B are a perspective view and a cross-sectional view showing the general arrangement of a second variation of the vibration actuator according to the third embodiment.
Figure 12B:
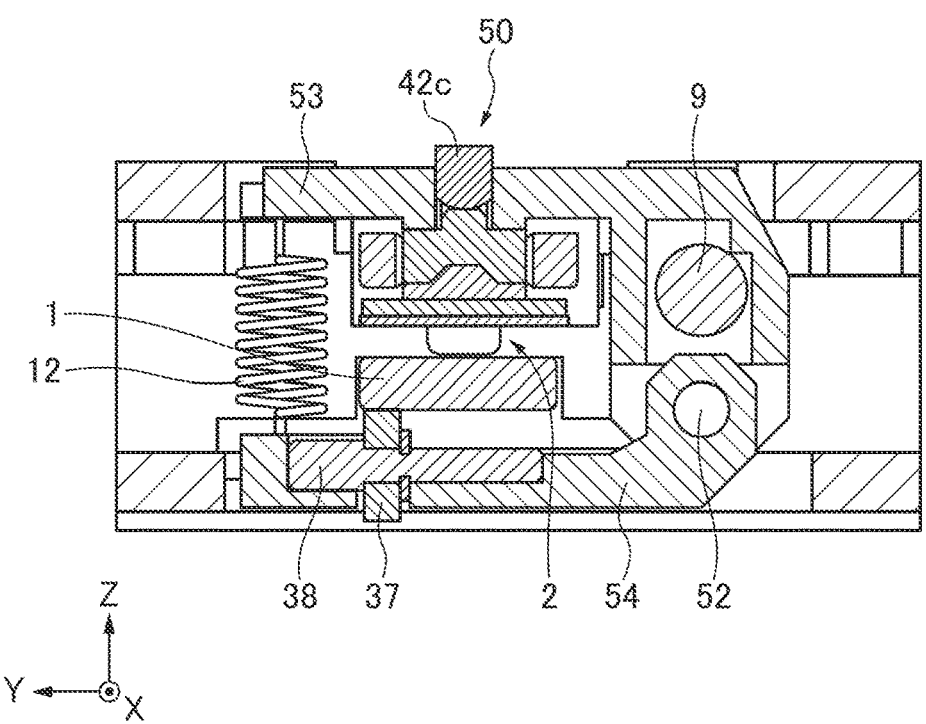

Next, a description will be given of a second variation of the vibration actuator 300 according to the third embodiment will be described. FIG. 12A is a perspective view showing the general arrangement of a vibration actuator 300B which is the second variation of the vibration actuator 300 according to the third embodiment. FIG. 12B is a cross-sectional view of the vibration actuator 300B, showing a cross-section orthogonal to the X-axis, which is cut substantially at the center of a vibration element unit 50 in the X-axis direction. The vibration actuator 300B corresponds to a vibration actuator configured by changing the arrangement of the vibration actuator 300 according to the third embodiment, including the two vibration elements 2a and 2b, to the arrangement including one vibration element 2. Therefore, description of the same components of the vibration actuator 300B as those of the vibration actuator 300, and components which are obviously equivalent from the viewpoint of structure to those of the above-described vibration actuators is omitted.

The vibration actuator 300B includes the vibration element unit 50 which is movable in the X-axis direction which is the longitudinal direction of the support shaft 9 and the contact body 1. The vibration element unit 50 is movably supported on the support shaft 9, and also includes a first supporting member 53 supporting the vibration element 2 and a second supporting member 54 connected to the first supporting member 53 by connection pins 52. Similar to the vibration element unit 40 forming the vibration actuator 300, the vibration element unit 50 is configured to adjust the position (height) of the vibration element 2 in the Z-axis direction by using a set screw 42c screwed into the first supporting member 53. Note that similar to the vibration actuator 200 according to the second embodiment, the roller 37 is mounted on the second supporting member 54 such that the roller 37 is rotatable about the rotation shaft 38 so as to enable the second supporting member 54 to smoothly move on the contact body 1. With this arrangement, it is possible to obtain the same advantageous effects as provided by the vibration actuator 300.

Figure 13:
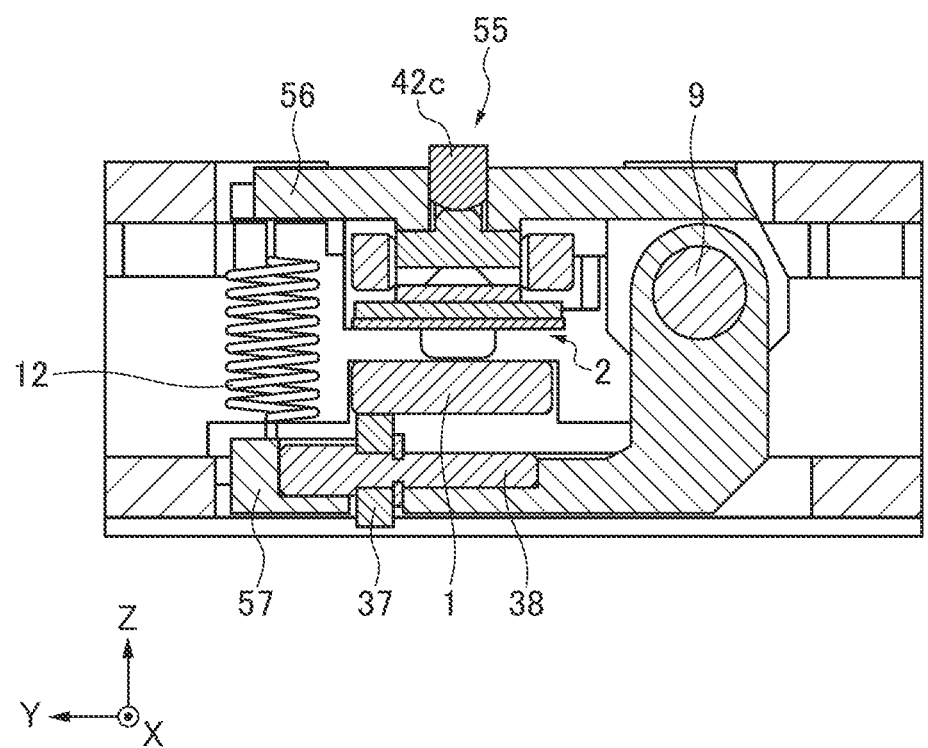
FIG. 13 is a cross-sectional view of a variation of a vibration element unit of the second variation of the vibration actuator according to the third embodiment.

Next, a description will be given of a variation of the vibration element unit 50 of the vibration actuator 300B as the second variation of the vibration actuator according to the third embodiment. FIG. 13 is a cross-sectional view of a vibration element unit 55 as the variation of the vibration element unit 50, showing a cross-section orthogonal to the X-axis, which is cut substantially at the center of the vibration element unit 55 in the X-axis direction. In the vibration element unit 55, a first supporting member 56 and a second supporting member 57 are rotatably and slidably supported by the common support shaft 9. The supporting structure and the like of the vibration element 2 in the vibration element unit 55 is the same as the supporting structure and the like of the vibration element 2 in the vibration element unit 50, and hence description thereof is omitted.

Figure 14:
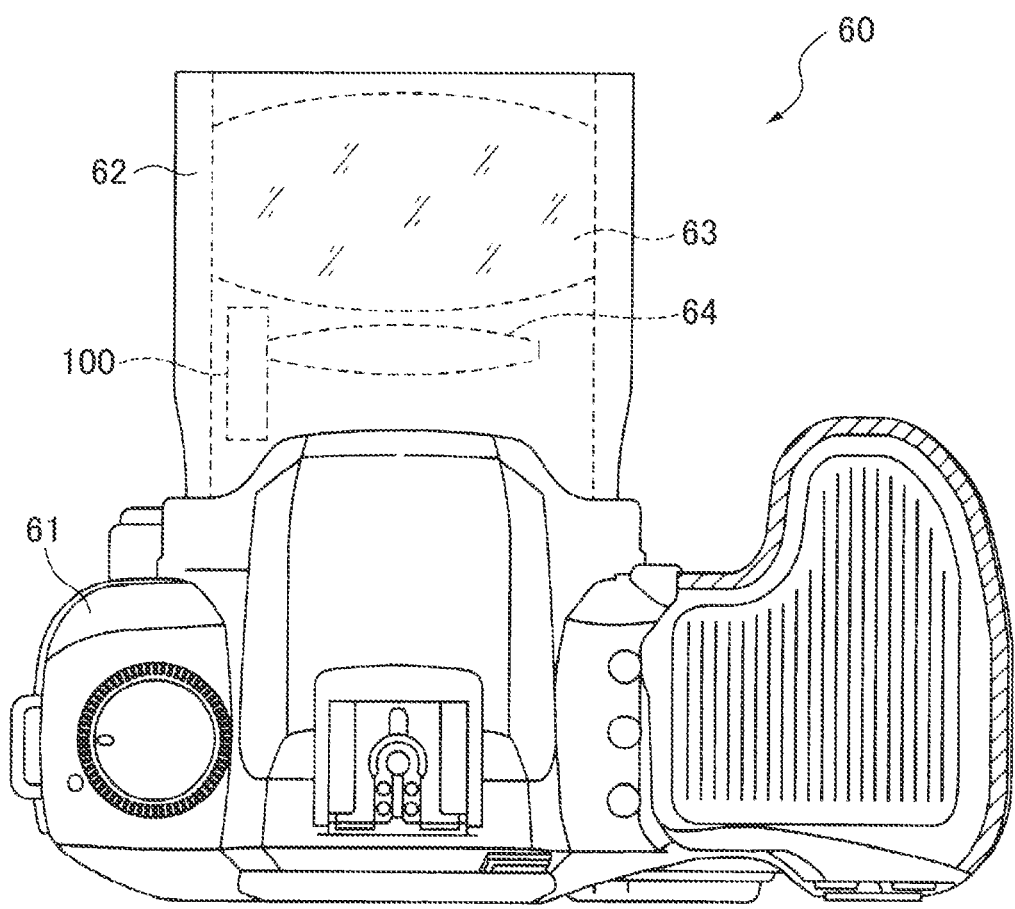
FIG. 14 is a top view showing the general arrangement of an image pickup apparatus equipped with the vibration actuator.

Next, a description will be given of various apparatuses to which the vibration actuator 100 is applied. FIG. 14 is a top view showing the general arrangement of an image pickup apparatus 60 equipped with the vibration actuator 100. The image pickup apparatus 60 has an image pickup apparatus body 61 including an image pickup device (not shown), and a lens barrel 62 (photographic lens) which can be attached and removed to and from the image pickup apparatus body 61. The lens barrel 62 includes a plurality of lens groups 63, a focus adjustment lens 64, and the vibration actuator 100. The vibration element unit 30 of the vibration actuator 100 is connected to a lens holding frame, not shown, for holding the focus adjustment lens 64 such that the driving (moving) direction of the vibration element unit 30 coincides with the optical axis direction. By driving the vibration actuator 100, it is possible to focus on an object by driving the focus adjustment lens 64 connected to the vibration element unit 30 in the optical axis direction.

Note that in a case where a zoom lens is arranged in the lens barrel 62, the vibration actuator 100 can be used as a drive source for moving the zoom lens in the optical axis direction. Further, in a case where an image blur correction lens is arranged in the lens barrel 62, the vibration actuator 100 can be used as a drive source for driving the image blur correction lens within a plane orthogonal to the optical axis.

Figure 15:
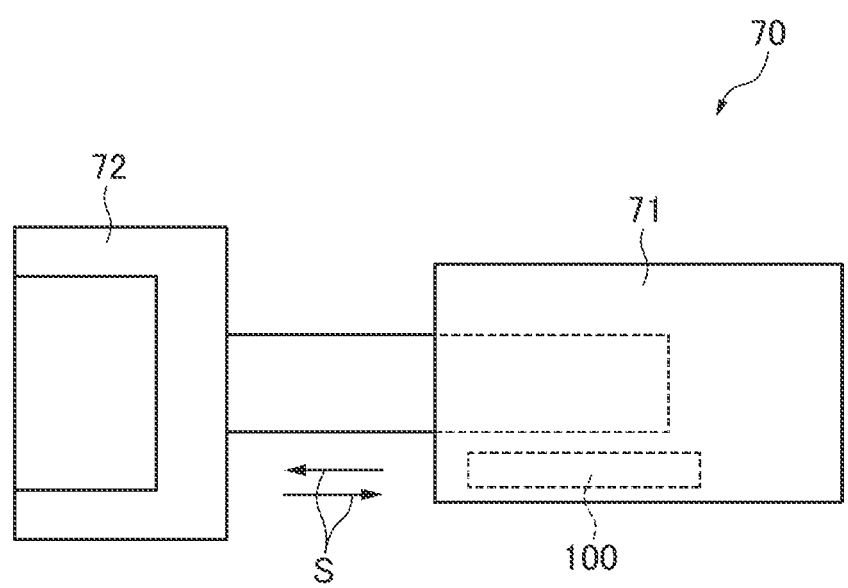
FIG. 15 is a view showing the general arrangement of a manipulator equipped with the vibration actuator.

FIG. 15 is a view showing the general arrangement of a manipulator 70 equipped with the vibration actuator 100. The manipulator 70 includes a supporting section 71, the vibration actuator 100 arranged in the supporting section 71, and a hand section 72 slidably arranged in a direction indicated by an arrow S with respect to the supporting section 71. The hand section 72 is connected to the vibration element unit 30 of the vibration actuator 100. The vibration actuator 100 is used as a drive source for driving the hand section 72 in the direction S (for extending and retracting the hand section 72 in the direction S). Note that the vibration actuators in the above-described embodiments can be widely applied not only to the image pickup apparatus 60 and the manipulator 70, but also to various apparatuses including a component requiring positioning.

The present invention has been described heretofore based on the embodiments thereof. However, the present invention is not limited to these embodiments, but it is to be understood that the invention includes various forms within the scope of the gist of the present invention. Further, the embodiments of the present invention are described only by way of example, and it is possible to combine the embodiments on an as-needed basis. For example, the first supporting member 7 and the second supporting member 8 of the vibration element unit 30, described in the first embodiment, may be provided with the function of adjusting the position of the vibration element in the Z-axis direction using the set screws 42a and 42b, described in the third embodiment, or the shim plates 47a and 47b, described in the first variation of the third embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-188430 filed Oct. 3, 2018, which is hereby incorporated by reference herein in its entirety.

What is claimed is:

1. A vibration actuator, including a vibration element unit and a contact body which are capable of relative movement to each other,
wherein the vibration element unit comprises:
a first vibration element that is in contact with the contact body;
an urging unit configured to bring the first vibration element and the contact body into contact with each other with predetermined pressure force;
a first holding member that holds the first vibration element;
a base;
a first supporting member that slidably supports the first holding member in a pressing direction in which the first vibration element is pressed against the contact body; and
a first connection member that is rotatably connected to the first supporting member, and is rotatably connected to the base about an axis parallel to a direction of the relative movement.

2. The vibration actuator according to claim 1, wherein the first supporting member and the base are connected by at least two or more units of the first connection member, whereby a parallel link is formed by the first supporting member, the base, and the first connection member.

3. The vibration actuator according to claim 1, wherein the first vibration element includes:
an elastic body having a flat plate shape, and
at least one protrusion that is formed on one surface of the elastic body and is in contact with the contact body, and
wherein an angle formed by a friction sliding surface of the contact body in slide contact with the first vibration element and the one surface of the elastic body is not larger than 2°.

4. The vibration actuator according to claim 3, further comprising a pressure transfer member that is arranged between the first vibration element and the first supporting member and transfers the pressure force to the first vibration element, and
wherein the pressure transfer member presses the first vibration element in an area in which at least part of the pressure transfer member overlaps with the at least one protrusion of the first vibration element when viewed from the pressing direction.

5. The vibration actuator according to claim 1, wherein the vibration element unit further includes:
a second vibration element that is arranged such that the second vibration element sandwiches the contact body with the first vibration element, and is brought into contact with the contact body by the pressure force,
a second holding member that holds the second vibration element,
a second supporting member that slidably supports the second holding member in the pressing direction, and
a second connection member that is rotatably connected to the second supporting member and is rotatably connected to the base about an axis parallel to the direction of the relative movement.

6. The vibration actuator according to claim 5, wherein the second supporting member and the base are connected by the at least two or more units of the second connection member, whereby a parallel link is formed by the second supporting member, the base, and the second connection member.

7. The vibration actuator according to claim 5, wherein the second vibration element includes:
an elastic body having a flat plate shape, and
at least one protrusion that is formed on one surface of the elastic body and is in contact with the contact body, and wherein an angle formed by a friction sliding surface of the contact body in slide contact with the second vibration element and the one surface of the elastic body is not larger than 2°.

8. The vibration actuator according to claim 7, further comprising a pressure transfer member that is arranged between the second vibration element and the second supporting member and transfers the pressure force to the second vibration element, and
wherein the pressure transfer member presses the second vibration element in an area in which at least part of the pressure transfer member overlaps with the at least one protrusion of the second vibration element when viewed from the pressing direction.

9. The vibration actuator according to claim 1, further comprising a support shaft that is arranged in parallel to the direction of the relative movement, and
a fixing unit that fixes the contact body, and
wherein the base is movably fitted on the support shaft in a state restricted from rotating about the support shaft, and the vibration element unit moves relative to the contact body.

10. The vibration actuator according to claim 1, further comprising a fixing unit that fixes the base, and
wherein the contact body is movably arranged in the direction of the relative movement.

11. An apparatus including:
the vibration actuator according to claim 1, and
a component driven by the vibration actuator.

12. A vibration actuator including a vibration element unit and a contact body which are capable of relative movement to each other,
wherein the vibration element unit comprises:
a first vibration element that is in contact with the contact body;
an urging unit configured to bring the first vibration element and the contact body into contact with each other with predetermined pressure force;
a first holding member that holds the first vibration element;
a first supporting member that slidably supports the first holding member in a direction in which the first vibration element is pressed against the contact body; and
an adjustment unit configured to adjust the position of the first vibration element with respect to the first supporting member in the pressing direction.

13. The vibration actuator according to claim 12, wherein the adjustment unit includes:
a first screw hole formed in the first supporting member in parallel to the pressing direction, and
a first screw member screwed into the first screw hole, and
wherein the position of the first vibration element with respect to the first supporting member in the pressing direction is adjustable by an amount of screwing the first screw member into the first screw hole.

14. The vibration actuator according to claim 12, wherein the adjustment unit includes:
a first pressure transfer member that is arranged between the first vibration element and the first supporting member and transfers the pressure force to the first vibration element, and
a first plate member having a predetermined thickness, which is arranged between the first supporting member and the first pressure transfer member.

15. The vibration actuator according to claim 12, wherein the first vibration element includes:
an elastic body having a flat plate shape, and
at least one protrusion that is formed on one surface of the elastic body and is in contact with the contact body, and
wherein an angle formed by a friction sliding surface of the contact body in slide contact with the first vibration element and the one surface of the elastic body is not larger than 2°.

16. The vibration actuator according to claim 15, further comprising a pressure transfer member that is arranged between the first vibration element and the first supporting member and transfers the pressure force to the first vibration element, and
wherein the pressure transfer member presses the first vibration element in an area in which at least part of the pressure transfer member overlaps with the at least one protrusion of the first vibration element when viewed from the pressing direction.

17. The vibration actuator according to claim 12, wherein the vibration element unit further includes:
a second vibration element that is arranged such that the second vibration element sandwiches the contact body with the first vibration element and is brought into contact with the contact body by the pressure force,
a second holding member that holds the second vibration element, and
a second supporting member that is rotatably supported about an axis parallel to a direction of the relative movement with respect to the first supporting member and slidably supports the second holding member in the pressing direction, and
wherein the adjustment unit includes:
a second screw hole formed in the second supporting member in parallel to the pressing direction, and
a second screw member screwed into the second screw hole, and
wherein the position of the second vibration element with respect to the second supporting member in the pressing direction is adjustable by an amount of screwing the second screw member into the second screw hole.

18. The vibration actuator according to claim 12, wherein the vibration element unit further includes:
a second vibration element that is arranged such that the second vibration element sandwiches the contact body with the first vibration element and is brought into contact with the contact body by the pressure force,
a second holding member that holds the second vibration element, and
a second supporting member that is rotatably supported about an axis parallel to a direction of the relative movement with respect to the first supporting member and slidably supports the second holding member in the pressing direction, and
wherein the adjustment unit includes:
a second pressure transfer member that is arranged between the second vibration element and the second supporting member and transfers the pressure force to the second vibration element, and
a second plate member having a predetermined thickness, which is arranged between the second supporting member and the second pressure transfer member.

19. The vibration actuator according to claim 17, wherein the second vibration element includes:
an elastic body having a flat plate shape, and
at least one protrusion that is formed on one surface of the elastic body and is in contact with the contact body, and wherein an angle formed by a friction sliding surface of the contact body in slide contact with the second vibration element and the one surface of the elastic body is not larger than 2°.

20. The vibration actuator according to claim 19, further comprising a pressure transfer member that is arranged between the second vibration element and the second supporting member and transfers the pressure force to the second vibration element, and wherein the pressure transfer member presses the second vibration element in an area in which at least part of the pressure transfer member overlaps with the at least one protrusion of the second vibration element when viewed from the pressing direction.

21. The vibration actuator according to claim 17, further comprising:

a support shaft that is arranged in parallel to the direction of the relative movement, and wherein the second supporting member is rotatably supported by the first supporting member about the support shaft and the first supporting member is movably fitted on the support shaft in a state restricted from rotating about the support shaft, whereby the vibration element unit moves relative to the contact body.

22. The vibration actuator according to claim 12, further comprising:

a support shaft that is arranged in parallel to the relative movement direction, and a fixing unit that fixes the contact body, and wherein the first supporting member is movably fitted on the support shaft in a state restricted from rotating about the support shaft, and the vibration element unit moves relative to the contact body.

23. The vibration actuator according to claim 12, further comprising:

a fixing unit that fixes the first supporting member, and wherein the contact body is movably arranged in a direction of the relative movement.

* * * * *